United States Patent
Gugel et al.

(10) Patent No.: US 12,330,501 B2
(45) Date of Patent: Jun. 17, 2025

(54) POWER-SPLIT AXLE DRIVE, AGRICULTURAL VEHICLE, AND METHOD FOR OPERATING A POWER-SPLIT AXLE DRIVE

(71) Applicant: DEERE & COMPANY, Moline, IL (US)

(72) Inventors: Rainer Gugel, Plankstadt (DE); David Mueller, Dettenheim (DE); Jens Letscher, Albessen (DE)

(73) Assignee: DEERE & COMPANY, Moline, IL (US)

( * ) Notice: Subject to any disclaimer, the term of this patent is extended or adjusted under 35 U.S.C. 154(b) by 275 days.

(21) Appl. No.: 18/048,903

(22) Filed: Oct. 24, 2022

(65) Prior Publication Data
US 2023/0226901 A1 Jul. 20, 2023

(30) Foreign Application Priority Data

Jan. 19, 2022 (DE) .......................... 102022101166.6
Jan. 19, 2022 (EP) ..................................... 22152192

(51) Int. Cl.
*B60K 6/365* (2007.10)
*B60K 6/52* (2007.10)
(Continued)

(52) U.S. Cl.
CPC ................ *B60K 6/365* (2013.01); *B60K 6/52* (2013.01); *B60K 17/344* (2013.01); *B62D 49/06* (2013.01);
(Continued)

(58) Field of Classification Search
CPC ........ B60K 6/365; B60K 6/387; B60K 6/442; B60K 6/48; B60K 2006/4808;
(Continued)

(56) References Cited

U.S. PATENT DOCUMENTS

2002/0107101 A1* 8/2002 Bowen ..................... B60K 6/52
 903/910
2011/0312459 A1* 12/2011 Morrow ................ F16H 37/065
 475/5
(Continued)

FOREIGN PATENT DOCUMENTS

DE 102007021732 A1 11/2008
DE 102013224383 A1 5/2015
(Continued)

OTHER PUBLICATIONS

European Search Report issued in application No. 22152192.5, dated Jul. 7, 2022, 23 pages.
(Continued)

*Primary Examiner* — Ernesto A Suarez
*Assistant Examiner* — Lillian T Nguyen

(57) ABSTRACT

A power-split axle drive for an agricultural vehicle including a first additional drive element, a first vehicle axle, a second vehicle axle, and a primary drive element for providing a torque which via a first shaft is able to be transmitted to a primary transmission. The primary transmission is connected to the second vehicle axle, and at least the second vehicle axle via the primary transmission is able to be driven by the torque of the primary drive element. The power-split axle drive includes a power-splitting transmission. The power-splitting transmission via a first gear set is connected to the second vehicle axle and the primary transmission and via a second shaft is connected to the first vehicle axle. The first additional drive element via a first switching element is able to be connected to the power-splitting transmission.

20 Claims, 16 Drawing Sheets

(51) Int. Cl.
*B60K 17/344* (2006.01)
*B62D 49/06* (2006.01)
*F16H 3/54* (2006.01)
*F16H 37/08* (2006.01)
*A01B 76/00* (2006.01)
*B60K 17/28* (2006.01)
*B60K 25/00* (2006.01)

(52) U.S. Cl.
CPC .......... *F16H 37/0806* (2013.01); *A01B 76/00* (2013.01); *B60K 17/28* (2013.01); *B60K 2025/005* (2013.01); *B60Y 2200/92* (2013.01)

(58) Field of Classification Search
CPC ...... B60K 2025/005; B06K 17/34–354; F16H 2200/2005; F16H 3/52–62
See application file for complete search history.

(56) References Cited

U.S. PATENT DOCUMENTS

| | | | |
|---|---|---|---|
| 2012/0077633 A1 | 3/2012 | Mueller et al. | |
| 2018/0290534 A1* | 10/2018 | Pan | B60K 6/365 |
| 2021/0362593 A1* | 11/2021 | Van Dingenen | B60K 6/365 |
| 2023/0226902 A1* | 7/2023 | Letscher | B60K 6/48 180/243 |
| 2023/0271506 A1 | 8/2023 | Wright et al. | |

FOREIGN PATENT DOCUMENTS

| | | |
|---|---|---|
| DE | 102014009866 A1 | 1/2016 |
| DE | 102014009866 B4 | 3/2017 |
| DE | 102017218858 A1 | 10/2018 |
| DE | 102017218858 B4 | 2/2019 |
| EP | 3626502 A1 | 3/2020 |
| EP | 3925809 A1 | 12/2021 |
| JP | 2007045177 A | 2/2007 |
| WO | WO 2020035238 A1 | 2/2020 |

OTHER PUBLICATIONS

European Search Report issued in application No. 22198911.4, dated May 8, 2023, 10 pages.
Extended European Search Report and Written Opinion issued in European Patent Application No. 24180479.8 dated Sep. 24, 2024, in 20 pages.
European Search Report issued in application No. 22198911.4, dated May 8, 2023, 20 pages.
Extended European Search Report and Written Opinion issued in European Patent Application No. 24219271.4 dated Apr. 4, 2025, in 19 pages.

* cited by examiner

POWER-SPLIT AXLE DRIVE, AGRICULTURAL VEHICLE, AND METHOD FOR OPERATING A POWER-SPLIT AXLE DRIVE

CROSS-REFERENCE TO RELATED APPLICATIONS

This application claims priority to German Patent Application No. 102022101166.6, filed Jan. 19, 2022, and European Patent Application No. 22152192.5, filed Jan. 19, 2022, which are hereby incorporated by reference.

FIELD OF THE DISCLOSURE

The disclosure relates to a power-split axle drive for an agricultural vehicle and to a method for operating a power-split axle drive.

BACKGROUND

DE 10 2007 021 732 A1 discloses a power-split axle drive for vehicles having at least two drivable vehicle axles, for example for commercial vehicles and agricultural vehicles. The power-split axle drive has a continuously variable transmission without an inter-axle differential, having at least one first and one second motor. The first motor here is connected to a first vehicle axle, and the second motor is connected to a second vehicle axle. The power-split axle drive furthermore has a clutch. A connection between the first and the second vehicle axle is able to be established by the clutch. The torque transmission capability of the clutch is adjustable as a function of a drive state of the vehicle. An agricultural vehicle having a power-split axle drive is known from EP 3 626 502 A1. The power-split axle drive comprises a sub-powertrain having an additional drive element, an electric motor. The electric motor by way of an actuatable torque transmission device for driving is able to be selectively connected to the power-split axle drive. DE 10 2013 224 383 A1 discloses a power-split axle drive having a power-split transmission and an additional drive element. EP 3 626 502 A1 as well as DE 10 2013 224 383 A1 both disclose that the additional drive element acts on the power-split transmission in such a manner that a lead motion of a vehicle axle is able to be controlled as a result.

SUMMARY

The known power-split axle drives disadvantageously have a design which is complex in terms of construction and/or is insufficient for agricultural vehicles. For example, it is disadvantageous that the rotating speed and/or force and/or the torque of the additional drive, for example of the electric motors used therefor, are/is too high and the rotating speed and/or torque transmitted to the power-split axle drive are/is thus too low. Likewise, efficient braking can disadvantageously not be implemented using the known power-split axle drives.

The present disclosure is therefore based on the object of proposing a power-split axle drive and an agricultural vehicle as well as a method by way of which the aforementioned problems are overcome. To be proposed for example are a power-split axle drive and an agricultural vehicle as well as a method, which are designed so as to be simpler in terms of construction and/or less complex and/or enable an efficient transmission of the rotating speed and/or of the torque from the additional drive to the power-splitting transmission and/or enable a more efficient operation, and/or the performance and/or the road worthiness and/or driving characteristics of the commercial vehicle, or of the power-split axle drive, respectively, are improved.

This object is achieved by a power-split axle drive having the features of one or more embodiments disclosed herein, and by an agricultural vehicle having the features of one or more embodiments disclosed herein, and by a method having the features of one or more embodiments disclosed herein. The dependent claims relate to additionally advantageous embodiments of the disclosure.

Proposed according to the disclosure is a power-split axle drive, for example powertrain, for an agricultural vehicle. The power-split axle drive comprises a first additional drive element and a first vehicle axle and a second vehicle axle and a primary drive element for providing a torque, and/or for example a rotating movement and/or a force. The torque, and/or for example the rotating movement and/or the force, by way of a first shaft is able to be transmitted to a primary transmission and/or introduced into the primary transmission. The primary transmission by or by way of the first shaft is thus connected to the primary drive element, for example connected so as to be drivable. The second vehicle axle is connected to the primary transmission, for example connected so as to be drivable. At least the second vehicle axle by or by way of the primary transmission is able to be driven by the torque, and/or for example the rotating movement and/or the force, of the primary drive element. The second vehicle axle by or by way of a third shaft is for example connected to the primary transmission, for example connected so as to be drivable. In other words, a torque, and/or for example a rotating movement and/or a force, which by the first shaft or by way of the first shaft is able to be introduced into the primary transmission and from the primary transmission by the third shaft or by way of the third shaft is able to be introduced into or onto the second vehicle axle, or is able to be transmitted to the latter, is thus able to be generated by the primary drive element. The power-split axle drive furthermore has a power-splitting transmission. The power-splitting transmission by or by way of a first gear set is connected to the primary transmission and the second vehicle axle, for example connected so as to be drivable. As a result, a rotating movement and/or a force and/or a torque from the primary drive element can be transmitted to or introduced into the primary transmission, and from the primary transmission by or by way of the first gear set transmitted to or introduced into the power-splitting transmission and/or vice versa. Likewise, a rotating movement and/or a force and/or a torque from the second vehicle axle by or by way of the first gear set can be transmitted to or introduced into the power-splitting transmission and/or vice versa. Moreover, the first vehicle axle by or by way of a second shaft is connected to the power-splitting transmission, for example connected so as to be drivable. In this way, a torque, and/or for example a rotating movement and/or a force, of the power-splitting transmission by way of the second shaft is able to be transmitted to or introduced into the first vehicle axle, and/or vice versa. The first additional drive element, for example for introducing a rotating movement and/or a force and/or a torque, by way of a first switching element or by a first switching element is able to be connected to the power-splitting transmission, for example able to be releasable connected, such as able to be connected in a releasably rotationally fixed manner and/or a releasably drivable manner.

For example, the power-splitting transmission by way of or by the first gear set can be connected to the third shaft, for example connected so as to be drivable. Thus, a rotating movement and/or a force and/or a torque from the primary drive element can be transmitted to or introduced into the primary transmission, and from the primary transmission to the third shaft, and by or by way of the first gear set transmitted to or introduced into the power-splitting transmission from the third shaft. Likewise, a rotating movement and/or a force and/or a torque from the second vehicle axle can be transmitted to or introduced into the third shaft, and by or by way of the first gear set transmitted to or introduced into the power-splitting transmission from the third shaft. The first gear set can also comprise a first pair of gear wheels, for example a first and a second fixed gear. The first fixed gear can be connected, for example in a rotationally fixed manner, to the third shaft, and the second fixed gear can be connected, for example in a rotationally fixed manner, to the power-splitting transmission. The first fixed gear can mesh with the second fixed gear, thus for example be in constant meshing engagement with said second fixed gear. As a result, a rotating movement and/or a force and/or a torque by or by way of the first and the second fixed gear can be transmitted or introduced between the third shaft and the power-splitting transmission, and/or vice versa.

The power-split axle drive can comprise a first differential, for example a front axle differential. The first differential, by way of the second shaft or by the second shaft, can be connected to the power-splitting transmission, for example connected so as to be drivable. As a result, a rotating movement and/or a force and/or a torque of the power-splitting transmission by the first differential or by way of the first differential may be able to be introduced into or transmitted to the first vehicle axle, and/or vice versa. The power-split axle drive can also comprise a second differential, for example a rear axle differential. The second differential, by way of the third shaft or by the third shaft, can be connected to the primary transmission, for example connected so as to be drivable. As a result, a rotating movement and/or a force and/or a torque of the primary transmission by the second differential or by way of the second differential may be able to be introduced into or transmitted to the second vehicle axle, and/or vice versa.

The first switching element can be activatable, for example selectively activatable, such as closable and openable, and/or meshable, and/or switchable and/or selectively engageable. The first switching element can for example be embodied as a first clutch. A switching element, for example the first switching element and/or a second and/or third and/or fourth and/or fifth switching element, hereunder can be understood to be a component which, depending on the activation state, can permit a relative movement between two components or provide a fixed connection for transmitting a rotating movement and/or a force and/or a torque. A relative movement is to be understood to be a rotation of two components, for example, wherein the rotating speed of the first component and the rotating speed of the second component differ from one another. Moreover, the rotation of only one of the two components is also conceivable, while the other component is stationary or rotates in an opposite direction. The switching elements, for example clutches, are for example elements with a friction fit. A force by way of an actuator can be introduced into the connection point of the two components here, as a result of which a frictional force by way of which a rotating movement and/or a force and/or a torque is able to be transmitted between the two rotatable components is produced. A non-activated switching element, for example a non-activated clutch, hereunder can be understood to be an opened switching element, for example an opened clutch. This means that a relative movement between the two components is possible. An activated switching element, for example an activated clutch, hereunder can be understood to be a closed switching element, for example a closed clutch. This means that no relative movement between the two components is possible. Accordingly, the two components rotate at the same rotating speed in the same direction. In an alternative embodiment, the switching elements, for example clutches, can be embodied as form-fitting elements. The actuator for activating the first switching element, for example the first clutch, can be embodied so as to be hydraulically, electromechanically, electromagnetically or else, for example, pneumatically activatable. The actuator, for example a first actuator, can close and open the first switching element, and/or a second actuator can close and open the second switching element, and/or a third actuator can close and open the third switching element, and/or a fourth actuator can close and open the fourth switching element, and/or a fifth actuator can close and open the fifth switching element. With an activated, for example closed, first switching element, a rotating movement and/or a force and/or a torque can thus be able to be transmitted from the first additional drive element to the power-splitting transmission, and/or vice versa. With a non-activated, for example opened, first switching element, no rotating movement and/or no force and/or no torque can thus be able to be transmitted from the first additional drive element to the power-splitting transmission. In other words, the first additional drive element by way of the closed first switching element can thus be able to be connected to the power-splitting transmission in such a manner that the power-splitting transmission is able to be driven by the first additional drive element. As a result, the first additional drive element can act on the power-splitting transmission in such a manner that a lead motion of the first vehicle axle is able to be feedback-controlled, for example also able to be set and/or adjusted.

The primary drive element is for example an internal combustion engine, for example an engine operated by gas, gasoline or diesel fuel. Alternatively, however, the primary drive element can also be implemented in the form of an electric machine. The first additional drive element is for example an electric machine, for example an electric motor. Moreover, an embodiment in the form of a hydraulic drive, for example a hydrostatic drive element, is also conceivable. The first additional drive element can have two rotation directions (first direction, second direction). The two rotation directions of the first additional drive element can be utilized to thus achieve a larger feedback-control range of the lead motion of the first vehicle axle.

The first vehicle axle and the second vehicle axle are vehicle axles which can be embodied so as to be able to be driven. Moreover, the first vehicle axle and/or the second vehicle axle, for example only the first vehicle axle, can be embodied so as to be able to be steered. The first vehicle axle can for example be a front axle, and/or the second vehicle axle can for example be a rear axle. The primary transmission is for example distinguished in that positive gearing of the rotating speed and/or the force and/or the torque takes place from a transmission input to a transmission output. The transmission input here is disposed on a side of the primary transmission that for example faces the primary drive element. The transmission output is for example situated on a side of the primary transmission that lies opposite the transmission input. The primary transmission can be embodied as, for example, a conventional stepped automatic transmission or as a stepless transmission, for example as a CVT (continuously variable transmission) or as an eIVT (electrical infinitely variable transmission) or as a hIVT (hydraulic infinitely variable transmission), or as a manual shift transmission or else as a double clutch transmission.

A shaft hereunder cannot be understood to be exclusively a, for example, cylindrical, rotatably mounted machine element for transmitting torques; rather, this is also to be understood to include general connecting elements which connect individual components or elements to one another. The respective components are for example connected to one another mechanically by the first, the second and the third shaft as well as the layshaft. This means that rotating movements and/or forces and/or torques are able to be transmitted by the first, the second and the third shaft and the layshaft.

The power-splitting transmission is for example a planetary gear set, or an epicyclic gear set, respectively. Such a planetary gear set can have at least three components, for example gear wheels and/or shafts. A component here can be understood to be an input and/or output for transmitting a rotating movement and/or force and/or a torque to and/or from the power-splitting transmission. In a two-component operation, one of the components, for example of the gear wheels and/or shafts, is fixed, as a result of which the transmission of a rotation and/or a force and/or a torque of the non-driven component results by default. In a three-component operation, the planetary gear set operates as a summation gear or a transfer case. In the summation gear, two components are embodied so as to drive, and one component is driven. In a transfer case in contrast, one component is embodied so as to drive, and two components are driven.

The power-split axle drive can be assigned a control device, or the power-split axle drive can comprise the control device. The control device can be connected to the power-split axle drive, for example to the components of the power-split axle drive, for example connected for signaling and/or transmitting signals and/or conducting data. The control device can serve for controlling and/or feedback-controlling and/or actuating the components connected to one another. Feedback-controlling of the lead motion of the first vehicle axle for example takes place in this way, for example while taking into account a currently prevailing steering angle or a rotating speed or a torque of the primary drive element and/or of the first and/or the second vehicle axle while negotiating a curve and/or a rotating speed and/or a torque. A steering angle here can be understood to be an angle of the wheels of a steerable axle in relation to the wheels of a non-steerable axle, or in relation to a longitudinal axis of a vehicle, respectively. Feedback-controlling the lead motion of the first vehicle axle as a function of a steering angle of one of the vehicle axles, or of both vehicle axles relative to one another, here can be understood to mean that a variation of the lead motion of the first vehicle axle is also associated with a variation of the steering angle. The lead motion here can be increased or decreased as required. The variation of the lead motion can, however, also depend on further or other parameters, for example the ground characteristics or the weather conditions. A variation of the lead motion here can take place in an automated manner by adequate controlling and feedback-controlling or be performed manually by the user by means of an input apparatus. Arrangements in which only one of the two vehicle axles is steerable or in which both vehicle axles are steerable, for example in the form of all-wheel steering, are conceivable here.

The first additional drive element may be able to be operated in a generative as well as motorized manner. The first additional drive element in the generative operation acts in a braking manner, which is to say that mechanical energy from a rotating movement and/or a force and/or a torque is converted into electric energy, for example. In the motorized operation of the first additional drive element in contrast, energy, for example electric energy, can be fed to the first additional drive element, as a result of which the additional drive element generates a rotating movement and/or a force and/or a torque and the first additional drive element acts in a driving or propelling manner. The first additional drive element can for example be operated in a motorized manner.

The power-split axle drive can also comprise a storage element. The storage element is distinguished for example in that said storage element can receive energy, store energy and dispense energy. The storage element is for example a battery, a rechargeable battery or a capacitor for storing electric energy. In further embodiments however, pressurized storage vessels for storing compressed gases or fluids, or kinetic energy stores are also conceivable. In a kinetic energy store, kinetic energy is stored in rotating masses, for example. The first additional drive element in terms of electronic power can be connected to the storage element by way of a connecting line. An electronic power connection can be understood to mean that generated electric energy, or stored electric energy, respectively, can be supplied to the storage element or retrieved from the latter, or can be supplied to the consumers, for example to the first additional drive element, by way of the connecting line. The storage element is optionally provided here. Said storage element serves for storing energy, for example electric energy, which is generated in the current operating state but for which there is no use. The stored energy can then be provided in operating states that require a lot of energy. However, embodiments of power-split axle drive in which energy is retrieved or generated only when said energy is required, for example for the direct operation of the first additional drive element, are also conceivable. The electric energy provided by the storage element can be used by the first additional drive element so as to operate the first additional drive element in a motorized manner in order to increase the lead motion of the first vehicle axle.

In a driving operation or coasting operation of the vehicle and/or of the power-split axle drive, the primary drive element by way of or by the first shaft can introduce a rotating movement and/or a force and/or a torque into the primary transmission. The rotating movement and/or a force and/or a torque introduced into the primary transmission imparts a positive gearing in the primary transmission, to the extent that a gear ratio or a driving position has been engaged. The prevailing rotating movement and/or the prevailing force and/or the prevailing torque in the case of an engaged gear ratio or driving position, by way of the third shaft at the transmission output of the primary transmission can be introduced into the second vehicle axle. Moreover, the rotating movement and/or the force and/or the torque of the primary drive element by way of the primary transmission can be introduced into or transmitted to the power-splitting transmission from the third shaft by way of the first gear set.

One or a plurality of operating modes can be implemented by the power-split axle drive, for example also the agricultural vehicle. The control device can for example be designed or specified for feedback-controlling and/or controlling and/or actuating one or a plurality of operating modes of the power-split axle drive or agricultural vehicle.

For example, a "generator" operating mode of the power-split axle drive or vehicle can be implemented, for example in a driving operation or coasting operation of the power-split axle drive and/or of the agricultural vehicle, for example for charging the storage element. The first additional drive element can be operated in a generative manner in the "generator" operating mode of the power-split axle drive or vehicle. In the generative operation of the first additional drive element, for example with a closed first switching element, by way of the primary drive element a rotating movement and/or a force and/or a torque can be introduced into or transmitted to the power-splitting transmission and from the power-splitting transmission into or to the first additional drive element. The rotating movement and/or the force and/or the torque introduced into the first additional drive element can be converted into electric energy by the first additional drive element, and the electric energy can be stored in the storage element. The storage element is optional in this arrangement; only the recuperation just described, for example in the "generator" operating mode of the vehicle, as a result of the generative operation in the first additional drive element is dispensed with.

In a vehicle having a steerable first vehicle axle, the ground engagement means, for example wheels or tracks, for example, can travel a larger distance than the ground engagement means, for example wheels or tracks, of the second vehicle axle of the vehicle. In vehicles with a rigid all-wheel drive, i.e., without a longitudinal differential, a constant rotating speed ratio between the first and the second vehicle axle of the vehicle is set. However, this leads to a disadvantageous steering capability of the vehicle for example when negotiating curves. In order for this to be prevented or compensated for, respectively, a constructive lead motion is provided in the vehicle. This means, for example, that the ground engagement means of the first vehicle axle have a higher circumferential speed than those of the second vehicle axle. To this end, a "lead motion" operating mode of the power-split axle drive and/or of the agricultural vehicle can thus be implemented, for example in a driving operation or coasting operation of the axle drive and/or of the vehicle and/or when the vehicle travels on a field, for example when cultivating the field, or when accompanying a harvester as a tractor/trailer combination with a transport truck. The first additional drive element can be operated in a motorized manner in the "lead motion" operating mode of the power-split axle drive and/or vehicle. With an activated, for example with a closed, first switching element, an additional rotating movement and/or an additional force and/or an additional torque of the first additional drive element here can be transmitted from the first additional drive element to the power-splitting transmission by the first switching element. The rotating movement and/or force transmitted to the power-splitting transmission and/or the transmitted torque of the primary drive element, and the additional rotating movement and/or force transmitted to the power-splitting transmission, and/or the transmitted additional torque of the first additional drive element can be superimposed by the power-splitting transmission, and a resultant rotating movement and/or a resultant force and/or a resultant torque may be able to be transmitted to the first vehicle axle, for example by or by way of the first differential. In this way, a lead motion of the first vehicle axle may advantageously be able to be set and/or adjusted, for example be able to be controlled and/or feedback-controlled. In other words, the first additional drive element, with a closed first switching element and in the motorized operation, acts on the power-splitting transmission in such a manner that the first additional drive element introduces a rotating movement and/or a force and/or a torque into the power-splitting transmission, which is superimposed by a rotating movement and/or force introduced into the power-splitting transmission by the primary drive element by way of the primary transmission and/or an introduced torque so that a lead motion of the first vehicle axle is able to be set and/or adjusted by the resultant rotating movement and/or force and/or the resultant torque. The variation of the lead motion here can advantageously cause a variation of the circumferential speed of the ground engagement means, for example wheels or tracks, on the first vehicle axle, for example an increase of the circumferential speed or a reduction of the circumferential speed of the ground engagement means on the first vehicle axle. An increase of the lead motion of the first vehicle axle here is to be understood to mean that the rotating speed of the first vehicle axle, or the circumferential speed of the ground engagement means of the first vehicle axle, respectively is further increased in relation to the second vehicle axle. In an analogous manner, a reduction of the lead motion of the first vehicle axle is to be understood to mean that the rotating speed of the first vehicle axle, or the circumferential speed of the ground engagement means of the first vehicle axle, respectively is reduced in relation to the second vehicle axle. In this way, a variation of the lead motion of the first vehicle axle can take place for example. In this way, a variation of the lead motion can take place for example while taking into account the currently prevailing steering angle while negotiating a curve. For example, the "generator" operating mode can be active at a first steering angle, i.e. the first additional drive element generates electric power, and the "lead motion" operating mode can be active at a second steering angle, the latter potentially being greater than the first steering angle, i.e. the first additional drive element consumes electric power for example, and transmits a rotating speed and/or a force and/or a torque to the power-split axle drive. The first steering angle can comprise a range from 0 degrees to 4 degrees, for example from 0 to 8 degrees, or for example a range from 0 to 12 degrees. The second steering angle can comprise a range of >4 degrees, for example of >8 degrees, or for example of >12 degrees. In the "lead motion" operating mode, the steering assistance assumes its role by switching on the first additional drive element, thus by varying, for example by increasing or reducing, the rotating speed and/or force and/or the torque on the first vehicle axle, this being advantageous when negotiating tight curves in the headland of a field so as to be able to negotiate smaller curve radii.

To the extent that no rotating movement and/or no force and/or no torque is generated at the first additional drive element, the axle rotating speeds of the first vehicle axle and of the second vehicle axle are established as in an all-wheel system with an opened longitudinal differential, or with an opened all-wheel clutch, respectively, or as in a vehicle driven purely on one axle (here the second vehicle axle). The first additional drive element in this state is then in a freewheeling mode.

The first additional drive element by the first switching element or by way of the first switching element is able to be selectively connected to the power-splitting transmission so that an additional rotating movement and/or an additional force and/or an additional torque is able to be transmitted to the power-splitting transmission by the first additional drive element. As a result, the rotating speed and/or force transmitted from the power-split axle drive to the first vehicle axle and/or the transmitted torque can be increased in comparison to the rotating speed and/or force and/or the torque provided by the power-split axle drive on the second vehicle axle, so that steering assistance is made possible when negotiating tight curves, for example in the headland of a field traveled on by the agricultural vehicle. This is advantageous when the driving of the first and the second vehicle axle in an all-wheel operation of the power-split axle drive, or of the agricultural vehicle, respectively, takes place in a manner coupled to the rotating speed or the torque. By feedback-controlling and/or controlling the first additional drive element, for example by feedback-controlling a rotating speed and/or a torque of the latter, for example by the control device, a longitudinal differential function having a variable torque distribution between the first vehicle axle and the second vehicle axle can advantageously be represented. Input data for this purpose can be, for example, the rotating speed or the torques at the primary drive element and/or the vehicle axles. The traction of the vehicle can be improved for the respective situation as a result. In the case of a constant torque ratio between the vehicle axles, a longitudinal differential function having a constant torque distribution can be represented. As a result of the feedback-control of the torque distribution, the driving characteristics of the vehicle can be feedback-controlled in a targeted manner and adapted to the respective environmental conditions. As a result of the corresponding actuation of the first additional drive element, a distribution of the brake output between the vehicle axles can thus also be implemented during the braking operation.

In an embodiment of the disclosure, the power-split axle drive comprises a layshaft. The first additional drive element, by the first switching element or by way of the first switching element, is able to be connected to the layshaft, for example able to be connected so as to be drivable, such as able to be releasably drivably connected. Likewise, the power-splitting transmission can be connected to the layshaft, for example connected so as to be drivable. The power-splitting transmission by way of the layshaft can thus be connected to the first additional drive element, for example connected so as to be drivable. In other words, the first additional drive element by the first switching element can thus be able to be connected to the layshaft in such a manner that the power-splitting transmission is able to be driven by the first additional drive element. The first switching element can be at least partially disposed on or at the layshaft. Likewise, the first switching element can be connected to the layshaft in an at least partially rotationally fixed manner. A rotating movement and/or a force and/or a torque of the first additional drive element by the first switching element may be able to be transmitted from the first additional drive element to the layshaft, and from the layshaft to the power-splitting transmission. The above-mentioned advantages of the power-split transmission can be implemented as a result. Moreover, an efficient transmission of the rotating speed and/or of the torque from the first additional drive to the power-splitting transmission can be implemented as a result.

According to one embodiment, the power-split axle drive comprises a second and a third gear set. The first switching element by way of or by the second gear set is able to be connected or is connected to the first additional drive element, for example able to be releasably connected or is releasably connected, such as able to be releasably drivably connected or is releasably drivably connected, and the layshaft by way of the third gear set is connected to the power-splitting transmission, for example connected so as to be drivable. A rotating movement and/or a force and/or a torque of the first additional drive element by the second gear set can be transmitted from the first additional drive element to the first switching element or be introduced into the latter, and/or vice versa, and from the first switching element be transmitted onward to the layshaft or be introduced into the latter, and/or vice versa, for example when the first switching element is closed. In turn, the layshaft by the first switching element or by way of the first switching element may be able to be connected to the second gear set, for example able to be connected so as to be drivable, such as able to be releasably drivably connected. With the closed first switching element, a rotating movement and/or a force and/or a torque can thus be able to be transmitted from the first additional drive element to the second gear set, and from the second gear set by way of the first switching element or by the first switching element be able to be transmitted to the layshaft and onward to the power-splitting transmission, and/or vice versa. The power-splitting transmission by way of or by the third gear set can be connected to the layshaft, for example connected so as to be drivable. A rotating movement and/or a force and/or a torque of the layshaft by the third gear set can be transmitted to or introduced into the power-splitting transmission, and/or vice versa. As a result, a rotating movement and/or a force and/or a torque from the first additional drive element, by way of the second gear set, may be able to be transmitted to the closed first switching element onward to the layshaft, and from the layshaft by the third gear set be able to be transmitted to the power-splitting transmission, and from the power-splitting transmission, for example by way of the first differential, be able to be transmitted to the first vehicle axle. The second gear set can also comprise a second pair of gear wheels, for example a first shifting gear and a third fixed gear. The third fixed gear can be connected to the first additional drive element, for example to an output shaft of the first additional drive element, for example connected so as to be drivable, such as connected in a rotationally fixed manner and/or so as to be drivable. The first shifting gear can be rotatably mounted on the layshaft, for example mounted so as to be freely rotatable and/or axially displaceable on the layshaft. Likewise, the first shifting gear can be connected to one side of the first switching element, for example connected in a rotationally fixed manner and/or so as to be drivable. The first shifting gear can mesh with the third fixed gear, thus for example be in constant meshing engagement with said third fixed gear. The first switching element by way of the first shifting gear or by the first shifting gear and by way of the third fixed gear or by the third fixed gear can thus be connected to the first additional drive element, for example connected so as to be drivable. In turn, the layshaft by the first switching element or by way of the first switching element can be connected to the first shifting gear, for example connected so as to be drivable, such as releasably drivably connected. With a closed first switching element, the layshaft by way of the first switching element can be connected to the first shifting gear in a rotationally fixed manner so that a rotating movement and/or a force and/or a torque of the first additional drive element is able to be transmitted by the third fixed gear. The first shifting gear can have more gear teeth than the third fixed gear. The gearing ratio i from the first shifting gear to the third fixed gear, for example when the first additional drive element is operated in a motorized manner, can be $$|i_1| = \frac{z_{Drive\ output1}}{z_{Drive\ input1}} \geq 1.2$$

where $z_{Drive\ output1}$=is the number of teeth of the first shifting gear and $z_{Drive\ input1}$=is the number of teeth of the third fixed gear. The gearing ratio can for example be $|i_1|\geq 2$, such as $|i_1|\geq 3$, most for example $|i_1|\geq 3.5$. The third gear set can comprise a third pair of gear wheels, for example a fourth and a fifth fixed gear. The fourth fixed gear can be connected to the layshaft V, and the fifth fixed gear can be connected to the power-splitting transmission, for example to a sun gear of the power-splitting transmission, for example connected in a rotationally fixed manner and/or so as to be drivable. The fourth fixed gear can mesh with the fifth fixed gear, thus for example be in constant meshing engagement with said fifth fixed gear. A rotating movement and/or a force and/or a torque may thus be able to be transmitted from the layshaft to the power-splitting transmission by the fourth and the fifth fixed gear, and/or vice versa. The fifth fixed gear can have more gear teeth than the fourth fixed gear. The gearing ratio i from the fifth fixed gear to the fourth fixed gear, for example when the first additional drive element is operated in a motorized manner, can be $$|i_2| = \frac{z_{Drive\ output2}}{z_{Drive\ input2}} \geq 1.2$$

where $z_{Drive\ output2}$=is the number of teeth of the fifth shifting gear and $z_{Drive\ input2}$=is the number of teeth of the fourth fixed gear. The gearing ratio can for example be $|i_2|\geq 2$, such as $|i_2|\geq 3$, most for example $|i_2|\geq 3.5$. The rotating speed transmitted from the first additional drive element to the power-splitting transmission can advantageously be reduced and the transmitted torque can be increased by the second and the third gear set. In this way, a transmission of the rotating speed and/or of the torque from the first additional drive to the power-splitting transmission can be implemented and improved as a result. In this way, a lead motion of the first vehicle axle can likewise be able to be set and/or adjusted advantageously more efficiently, for example be able to be controlled and/or feedback-controlled more efficiently.

In an embodiment of the disclosure the power-splitting transmission is embodied as a planetary gear set. A ring gear of the power-splitting transmission by way of or by the first gear set can be connected to the third shaft, for example be connected so as to be drivable. For example, the ring gear can be connected to the second fixed gear, for example connected in a rotationally fixed manner and/or so as to be drivable. As a result, a force and/or a rotating movement and/or a torque from the primary drive element, by way of the primary transmission, may be able to be transmitted to the third shaft and, by way of the first gear set, onward to the ring gear and thus for example the power-splitting transmission, or the planetary gear set, respectively. The first vehicle axle, by way of the second shaft or by the second shaft, can be connected to a planet carrier, or a web of the power-splitting transmission, respectively, for example connected so as to be drivable. For example, the planet carrier can be connected to the second shaft, for example connected in a rotationally fixed manner and/or so as to be drivable. As a result, a force and/or a rotating movement and/or a torque from the planet carrier of the power-splitting transmission may be able to be transmitted to the second shaft, and for example by way of the first differential, transmitted or introduced onward to or into the first vehicle axle. Conversely, a force and/or a rotating movement and/or a torque can likewise also be able to be transmitted to or introduced into the power-splitting transmission. A planet set, for example one or a plurality of planet gears, which mesh in each case with the sun gear and the ring gear, thus are in constant meshing engagement with said sun gear and ring gear, can be rotatably mounted on the planet carrier. The planet set can for example have a set of planet gears. The planet set can comprise three planet gears. Moreover, the sun gear of the power-splitting transmission, by way of the fifth fixed gear and the fourth fixed gear, and for example onward by way of the layshaft and the first switching element and the second gear set, is connected to the first additional drive element, for example connected so as to be drivable. As a result, a force and/or a torque from the first additional drive element, by way of the second gear set and the first switching element, may be able to be transmitted to the layshaft, and from the layshaft by way of the fourth fixed gear and the fifth fixed gear to the sun gear of the power-splitting transmission. The above-mentioned advantages of the power-split axle drive can be implemented as a result.

In an embodiment of the disclosure, a first brake is disposed between the first additional drive element and the power-splitting transmission. The power-split axle drive can thus additionally comprise the first brake. The first brake can be disposed on the layshaft. The first brake can at least partially be connected to the layshaft, for example connected in a rotationally fixed manner. The layshaft by the first brake may be able to be held or inhibited in relation to rotation, for example be able to be releasably held or inhibited in relation to rotation. In other words, a brake, for example the first and a second and a third brake, can be understood to be a friction-fitting component which on one side is connected to a stationary element, for example a housing or a vehicle chassis, and on the other side is connected to a rotatable element, for example a shaft. Herein, a force by way of an actuator is typically introduced into the connection point, this resulting in a frictional force by way of which a rotating movement of the rotatable component is supported in relation to the stationary component, for example, and the rotating movement is thus inhibited or prevented, respectively. For example, the rotating element of the first brake can be connected to the layshaft, for example connected in a rotationally fixed manner, and the stationary element can be connected to a transmission housing or a housing or a vehicle chassis. A non-activated brake hereunder is to be understood to mean an opened brake. This means that the rotatable component is in the freewheeling state, i.e., that the brake for example does not influence the rotating speed of the rotatable component. With an activated or closed brake, respectively, a reduction of the rotating speed of the rotatable component takes place, depending on the application, the reduction of the rotating speed of the rotatable component can take place up to a standstill. This then means than a fixed connection between the rotatable component and the stationary component is able to be established. With a closed first brake, a purely mechanical operation of the power-split axle drive can thus be implemented, i.e., there is a rigid connection between the first and the second vehicle axle so that a rotating movement and/or a force and/or a torque can be transmitted between the vehicle axles only in a purely mechanical manner. Alternatively, thereto, embodiments in which the brake in the activated state is opened, and closed in the non-activated state, are also conceivable. A form-fitting brake is also conceivable in further alternative embodiments. In form-fitting connections, a, for example rotationally fixed, connection between two components takes place by virtue of the contours of the components to be connected engaging with one another. Form-fitting connections have for example the advantage that said form-fitting connections can transmit high forces and moments while having comparatively small dimensions and weight. Moreover, the energy to be applied for establishing the connection is substantially less than in friction-fitting connections, as a result of which the actuator can be of a smaller design, for example. The actuator for activating the brake can be embodied so as to be hydraulically, electromechanically, electromagnetically or else, for example, pneumatically activatable. The actuator for activating the brake here can be embodied like the actuator for activating the switching element. As has already been described above, a driving state in which a rigid connection between the first and the second vehicle axle is required can advantageously be able to be implemented by the first brake. In this case, the first additional drive element does not have to permanently build up a counter moment and thus consume electric energy. As an alternative to the first brake, the power-split axle drive can also comprise a fifth switching element. A first brake is not used in this case, but the fifth switching element. The fifth switching element can be activatable, for example selectively activatable, such as closable and openable, and/or meshable, and/or switchable and/or selectively engageable. The fifth switching element can be configured as a fifth clutch. With an activated, for example closed, fifth switching element, only a mechanical rotating movement and/or a mechanical force and/or a mechanical torque can thus be transmitted for example. When the fifth switching element is closed, this leads to blocking of the power-splitting transmission and to the ring gear or the ring of the power-splitting transmission rotating at the same rotating speed as the sun gear and the second shaft and/or the carrier. The gearing ratio i in this case is i=1, and the rotating speed and/or force and/or the torque can be transmitted only in a mechanical manner. With a non-activated, for example opened, fifth switching element, a rotating movement and/or a force and/or a torque may be able to be transmitted from the first additional drive element to the power-splitting transmission. In other words, with an activated, for example closed, fifth switching element, the third gear set, for example the fifth fixed gear, and/or the power-splitting transmission, for example the sun gear, by the fifth switching element or by way of the fifth switching element, can be connected to the second shaft, for example connected to one another in a rotationally fixed manner. When the fifth switching element is closed, the relative rotating speed of the sun gear and the second shaft is 0 rpm. In this case, a rotating movement and/or a force and/or a torque can be transmitted only in a mechanical manner. There is also the possibility of using the first additional drive element to extract a force and/or a torque from the power-split axle drive, for example in the above-mentioned "parking brake" and "vehicle axle brake" operating modes.

According to one embodiment, the power-split axle drive comprises a second additional drive element. The second additional drive element, for example by way of or by the first shaft, can be connected to the primary drive element, for example connected so as to be drivable. The force able to be generated by the primary drive element and/or the rotating movement able to be generated and/or the torque able to be generated is able to be introduced into or able to be transmitted to the second additional drive element and/or the primary transmission. The torque able to be generated by the primary drive element and/or the force able to be generated and/or the rotating movement able to be generated, for example by way of a gearing stage, for example a belt or chain mechanism or a fourth gear set or a fourth shaft, can be able to be introduced into and/or transmitted to the second additional drive element. The second additional drive element can have two rotation directions (first direction, second direction). For example, the torque able to be generated by the primary drive element and/or the force able to be generated and/or the rotating movement able to be generated, by way of the first shaft, may be able to be transmitted to the gearing stage and then to the second additional drive element. The gearing stage, for example the fourth gear set, can also comprise a fourth pair of gears, for example a sixth and a seventh fixed gear. The sixth fixed gear can be connected to the first shaft, and the seventh fixed gear can be connected to, for example, an output shaft of the second additional drive element, for example connected in a rotationally fixed manner. The sixth fixed gear can mesh with the seventh fixed gear, thus be for example in constant meshing engagement with said seventh fixed gear. A rotating movement and/or a force and/or a torque from the first shaft, by the sixth and the seventh fixed gear, can thus be transmitted to or introduced into the second additional drive element. The second additional drive element is for example an electric machine, such as an electric motor. Moreover, an embodiment in the form of a hydraulic drive, for example a hydrostatic drive element, is also conceivable. The second additional drive element, in terms of electronic power, can be connected to the storage element and/or to the first additional drive element by way of the connecting line. Moreover, the second additional drive element, in terms of electronic power, can be connected to a secondary output, for example by way of the connecting line and/or a further connecting line. As already mentioned, an electronic power connection is to be understood to mean that generated electric energy, or stored electric energy, respectively, can be supplied to the storage element or retrieved from the latter, or be supplied to the consumers, for example to the secondary output and/or the second additional drive element. The secondary output here, like the storage element, is optionally provided. This means that a secondary output does not mandatorily have to be provided. Moreover however, embodiments having more than one secondary output are also conceivable. Embodiments of power-split axle drive in which energy is retrieved from the storage element or generated only when said energy is required, for example for the direct operation of the secondary output and/or the second additional drive element, are also conceivable.

The second additional drive element may be able to be operated in a generative as well as motorized manner. The second additional drive element in the generative operation acts in a braking manner, which is to say that mechanical energy from a rotating movement and/or a force and/or a torque is converted into electric energy, for example. In the motorized operation of the second additional drive element in contrast, energy, for example electric energy, is fed to the second additional drive element, as a result of which a rotating movement and/or a force and/or a torque is generated, the second additional drive element acting in a driving or propelling manner as a result. The first and the second additional drive element both can be simultaneously operated in a generative manner, both be operated in a motorized manner, or one operated in a generative manner and one in a motorized manner.

In the "lead motion" operating mode, the second additional drive element can be operated in a generative manner and the first additional drive element can be operated in a motorized manner. The second additional drive element may be able to be operated in a generative manner, i.e., the energy introduced in the form of the rotating movement and/or of the force and/or of the torque is converted into electric energy. This electric energy can be used for operating the secondary output, for example the electric secondary output, and/or electric energy can be stored in the optional storage element and/or the electric energy can be provided to the first additional drive element, wherein the first additional drive element is for example operated in a motorized manner. The above-mentioned advantages of the power-split axle drive can advantageously be achieved as a result. To the extent that the primary transmission is in a neutral position, no rotating movement and/or force and/or no torque of the primary drive element is transmitted to the third shaft. Rather, the rotating movement and/or force and/or the torque in this instance is introduced into or transmitted to the second additional drive element exclusively. To the extent that the second additional drive element is operated in a generative manner, electric energy is generated. Said electric energy can again be used for operating the secondary output and/or the first additional drive element and/or be stored in the storage element.

The second additional drive element can also be operated in a motorized manner. The second additional drive element, in addition to the rotating movement and/or force, introduced by the primary drive element, and/or the introduced torque, can likewise introduce a rotating movement and/or force and/or a torque into the primary transmission. In this way, an increase of the drive output can briefly take place, for example, to the extent that this is required by the respective driving state.

For charging the storage element, for example, the first additional drive element and/or the second additional drive element can however also be operated in a generative manner, for example in the "generator" operating mode or the driving or coasting operation. To this end, a rotating movement and/or a force and/or a torque by the primary drive element can be introduced into or transmitted to the second additional drive element, and by way of the primary transmission be introduced into or transmitted to the power-splitting transmission and onward into the first additional drive element.

In an embodiment of the disclosure, a second switching element and/or a second brake are/is disposed on or at the second shaft. The second switching element and/or the second brake can be disposed between the power-splitting transmission and the first vehicle axle, for example the power-splitting transmission and the first differential. The second switching element here can be disposed between the second brake and the first vehicle axle, for example the second brake and the first differential. The power-splitting transmission, by way of the second switching element or by the second switching element, may be able to be connected to the first vehicle axle, for example the first differential, for example able to be releasably connected, such as able to be connected in a releasably, rotationally fixed and/or releasably drivable manner. The second switching element is for example a second clutch. In other words, the second switching element on one side, by way of one part of the second shaft, can thus be connected to the first vehicle axle, for example the first differential, and on another side, by way of another part of the second shaft, can be connected to the power-splitting transmission. The second switching element can be activatable, for example selectively activatable, such as closable and openable, and/or meshable, and/or switchable and/or selectively engageable. With an activated, for example closed, second switching element, a rotating movement and/or a force and/or a torque from the power-splitting transmission can thus be able to be transmitted to the first vehicle axle, for example by way of the first differential, and/or vice versa. With a non-activated, for example opened, second switching element, no rotating movement and/or no force and/or no torque can thus be able to be transmitted from the power-splitting transmission to the first vehicle axle, for example by way of the first differential, and/or vice versa. In other words, the power-splitting transmission, by the closed second switching element, can thus be able to be connected to the first vehicle axle, for example by way of the first differential, in such a manner that the first vehicle axle is able to be driven by the power-splitting transmission and/or vice versa.

The second brake can for example be disposed between the second switching element and the power-splitting transmission. The second brake can be disposed on the second shaft, for example be connected to the second shaft, such as be connected to the second shaft in a rotationally fixed manner. The second shaft by way of the second brake may be able to be held against rotating, for example be able to be releasably held against rotating. The second shaft by way of the second brake may be able to be releasably connected to, for example a transmission housing or a frame, for example able to be releasably held against rotating. In other words, the second brake on one side can thus be connected to the second shaft, and on another side be held or inhibited in relation to a rotating movement, for example be connected to the transmission housing or the frame. For example, the rotating element of the second brake can be connected to the second shaft, for example connected in a rotationally fixed manner, and the stationary element of the second brake can be connected to a transmission housing or a frame, as a result of which the second shaft is held and/or inhibited in relation to a rotating movement. This is advantageous, for example, when a driving state in which a rotating movement and/or a force and/or a torque from the first additional drive element or the first vehicle axle is to be transmitted, for example only, to the second vehicle axle, or no rotating movement and/or no force and/or no torque is to be transmitted to the first and the second vehicle axle is desired. With the power-split axle drive, further operating modes can be implemented by the second brake and/or the second switching element.

A further operating mode can be a "fully electric" operating mode. The first and the second switching element as well as the second brake here may be able to be activated in such a manner that the second vehicle axle is able to be driven only by way of the first additional drive element. In the "fully electric" operating mode, the first switching element is activated, for example closed, and the second switching element is activated, for example opened, and the second brake is activated, for example closed. As a result, a power flux from the first additional drive element to the second vehicle axle can be implemented, thus a rotating movement and/or a force and/or a torque be transmitted for example from the first additional drive element to the second vehicle axle. A rotating movement and/or a force and/or a torque which is transmitted from the power-splitting transmission to the second shaft, thus for example in the direction of the first vehicle axle, can be held and/or inhibited and/or supported on or by the closed second brake. For example, the second shaft can be held or inhibited in relation to a rotating movement by the second brake. For example, the second shaft can be fixedly established in relation to the transmission housing or the frame by the second brake. In the "fully electric" operating mode, the drive of the second vehicle axle can be performed by the first additional drive element independently of the operating state of the primary drive element. The primary drive element can for example be switched off or be decoupled from the primary transmission, or the primary transmission can be in the neutral gear. The operating mode "fully electric" may be able to be selected by means of the input and output unit. In this way, a purely electric operation of the power-split axle drive, for example also of the vehicle, can advantageously be achieved. It is furthermore advantageous that for example the one electrically operated crawling speed and/or the maneuvering of the agricultural vehicle, for example in a farmyard, can be implemented by the "fully electric" operating mode. For example, the agricultural vehicle in the "fully electric" operating mode can advantageously be remote controlled, for example in order to hook up an implement to the vehicle.

A further operating mode can be a "parking brake" operating mode. The second switching element and the first and the second brake here may be able to be activated in such a manner that the power-split axle drive is able to be implemented as a parking brake, the vehicle thus for example is held in position. In the "parking brake" operating mode, the second switching element is activated, for example closed, and the first brake is activated, for example closed, and the second brake is activated, for example closed. As a result, a power flux, thus a rotating movement and/or a force and/or a torque, from the first and/or the second vehicle axle can be transmitted to the power-split axle drive and be supported. The vehicle is held in its position as a result. For example, a rotating movement and/or force and/or a torque which from the first vehicle axle transmit to the second shaft at the second brake, can be inhibited, for example held and/or supported, and the second shaft by the second brake can be inhibited, for example held and/or supported in relation to a transmission of the rotating movement and/or the force and/or the torque. For example, the second shaft can be fixedly established in relation to the transmission housing or the frame by the second brake. For example, a rotating movement and/or a force and/or a torque which from the second vehicle axle by way of the first gear set and the power-splitting transmission and the third gear set is transmitted to the layshaft V and the first brake can be inhibited, for example held and/or supported, and the layshaft by the first brake can be inhibited, for example held and/or supported in relation to a transmission of the rotating movement and/or the force and/or the torque. For example, the layshaft can be fixedly established in relation to the transmission housing or the frame by the first brake. For example, a rotating movement and/or a force and/or a torque which from the second vehicle axle by way of the first gear set is transmitted to the power-splitting transmission, and onward to the second brake by way of the second shaft can also be transmitted. The second shaft here, by the second brake, can be inhibited, for example held and/or supported, in relation to a transmission of the rotating movement and/or the force and/or the torque. For example, the second shaft can be fixedly established in relation to the transmission housing or the frame by the second brake. In the "parking brake" operating mode, the primary drive element can be switched off, or be decoupled from the primary transmission, or the primary transmission can be in the neutral gear. The vehicle can thus for example be stationary. The operating mode "parking brake" may be able to be selected by means of the input and output unit. In this way, an operation of the power-split axle drive as a parking brake can advantageously be achieved.

A further operating mode can be a "vehicle axle brake" operating mode. The second switching element and the first and the second brake here may be able to be activated in such a manner that the power-split axle drive is able to be implemented as a brake, the vehicle thus for example is able to be decelerated by the power-split axle drive. In the "vehicle axle brake" operating mode, the second switching element is activated, for example closed, and the first and the second brake are at least partially or completely activated, for example at least partially or completed closed. The first and the second brake can thus have slippage and/or drag. For example, the rotating speed of the layshaft can be reduced by the first brake, and the rotating speed of the second shaft can be reduced by the second brake, or the layshaft and/or the second shaft can even be held so as to stand still. As a result, a power flux, thus a rotating movement and/or a force and/or a torque, from the first vehicle axle can at least be partially transmitted to the second brake, and/or from the first vehicle axle by way of the power-splitting transmission at least be partially transmitted to the third shaft and onward to a rear axle brake, and/or from the first vehicle axle by way of the power-splitting transmission at least be partially transmitted to the first brake, and the vehicle can be braked. For example, at least 10%, for example at least 20%, such as at least 25% of the power flux of the first vehicle axle can be transmitted to the second brake. In the "vehicle axle brake" operating mode, the primary drive element can be switched on, thus be in operation, for example thus move the vehicle. In this way, an operation of the power-split axle drive as a brake can advantageously be achieved.

In an embodiment of the disclosure, the power-split axle drive is assigned at least one control device; the power-split axle drive can for example comprise the control device. The control device, for example by way of one or a plurality of control lines, such as by way of one or a plurality of bidirectional control lines, for controlling and/or feedback-controlling and/or actuating can be connected to the first and/or the second additional drive element and/or the secondary output and/or the storage element and/or the first and/or the second and/or the third and/or the fourth switching element, for example the actuators thereof, and/or to the primary drive element and/or the primary transmission and/or the power-splitting transmission and/or a first and/or a second brake, for example the actuators thereof, for example be connected to the aforementioned for signaling and/or transmitting signals and/or conducting data.

In an embodiment of the disclosure, the control device is specified and/or configured for actuating the power-split axle drive, for example the first and/or the second brake, for example the actuators thereof, and/or the first and/or the second and/or a third and/or a fourth switching element, for example the actuators thereof, and/or the power-splitting transmission, and/or the first and/or the second additional drive element and/or the primary drive element and/or the primary transmission as a function of an operating mode of the power-split axle drive and/or of the vehicle. A plurality of different operating modes, for example the operating modes mentioned above, which are for example able to be selected and able to be predefined for the at least one control device for actuating the power-split axle drive, can be provided herein. In other words, the control device is configured in such a manner that the power-split axle drive, for example the above-mentioned components of the power-split axle drive, are able to be actuated as a function of an operating mode of the power-split axle drive and/or of the vehicle. The above-mentioned operating modes "generator" and/or "lead motion" and/or "fully electric" and/or "parking brake" and/or "vehicle axle brake" and/or the generative as well as the motorized operation of the first and the second additional drive element can for example be advantageously able to be actuated by the control device.

In an embodiment of the disclosure, a third switching element is disposed between the primary drive element and the second additional drive element and/or the primary drive element and the primary transmission, and/or a fourth switching element is disposed between the primary transmission and the primary drive element and/or the primary transmission and the second additional drive element. The third and the fourth switching element can be disposed on or at the first shaft. The primary drive element, by way of the third switching element or by the third switching element, may be able to be connected to the second additional drive element and/or the primary transmission, for example able to be releasably connected, such as able to be connected in a releasable, rotationally fixed manner and/or able to be releasably drivably connected. The third switching element is for example a third clutch. In other words, the third switching element on one side by way of one part of the first shaft can thus be connected to the primary drive element, and on another side by way of another part of the first shaft, be connected to the primary transmission and/or, for example by way of the gearing stage, for example the fourth gear set, be connected to the second additional drive element. In this way, a selective separation of the primary drive element from the power-split axle drive, or a connection therebetween, respectively, is able to be established in the arrangement just described. With an opened third switching element, a rotating movement and/or a force and/or a torque thus cannot be introduced into the power-split axle drive from the primary drive element, nor conversely be introduced from the power-split axle drive into the primary drive element. With an opened third switching element, the primary drive element in terms of rotation is thus separated from the power-split axle drive. The third switching element can be activatable, for example selectively activatable, such as closable and openable, and/or meshable, and/or switchable and/or selectively engageable. With an activated, for example closed, third switching element, a rotating movement and/or a force and/or a torque may thus be able to be transmitted from the primary drive element to the primary transmission and/or, for example by way of the gearing stage, to the second additional drive element, and/or vice versa. As a result, with a closed third switching element, braking energy can be converted into electric energy and stored in the storage element in the driving and/or coasting operation in the case of a generative operation of the first and/or the second additional drive element. With a non-activated, for example opened, third switching element, no rotating movement and/or no force and/or no torque can thus be able to be transmitted from the primary drive element to the primary transmission and/or, for example by way of the gearing stage, to the second additional drive element, and/or vice versa. With a non-activated third switching element, only a purely electric driving state may thus be able to be implemented by the motorized operation of the first additional drive element and/or of the second additional drive element. The primary transmission, by way of the fourth switching element or by the fourth switching element, may be able to be connected to the second additional drive element and/or the primary drive element, for example able to be releasably connected, such as able to be connected in a releasable, rotationally fixed manner and/or able to be releasably drivably connected. The fourth switching element can for example be a fourth clutch. In other words, the fourth switching element on one side by way of one part of the first shaft can thus be connected to the primary transmission, and on another side by way of another part of the first shaft, for example by way of the gearing stage, be connected to the second additional drive element and/or the primary drive element. The fourth switching element here can be disposed on the first shaft so as to be directly adjacent to the primary transmission. The fourth switching element can be activatable, for example selectively activatable, such as closable and openable, and/or meshable, and/or switchable and/or selectively engageable. With an activated, for example closed, fourth switching element, a rotating movement and/or a force and/or a torque from the primary transmission can thus be introduced into or transmitted to the power-split axle drive and/or vice versa. With a non-activated, for example opened, third switching element, no rotating movement and/or no force and/or no torque from the primary transmission can thus be introduced into or transmitted to the power-split axle drive and/or vice versa. With the opened fourth switching element, the primary transmission is thus decoupled from the primary drive element and/or the second additional drive element. In other words, with the opened fourth switching element, the primary transmission in terms of rotation can thus be separated from the primary drive element and/or from the second additional drive element. This means that a mechanically introduced propulsion cannot be implemented by way of the primary transmission. In an alternative embodiment, the fourth switching element, instead of being disposed between the primary transmission and the primary drive element, or the primary transmission and the second additional drive element, respectively, can also be disposed on the side of the transmission output of the primary transmission. In this case, with the opened third switching element, it is not the transmission input but the transmission output of the primary transmission that in terms of rotation is separated from the primary drive element, or the second additional drive element, respectively, this in functional terms being identical synonymously to the arrangement described above. For example, the third and/or the fourth switching element can also be disposed in the primary transmission. Alternatively, thereto, an arrangement without a third and a fourth switching element is also conceivable; however, the primary transmission here has to be in a neutral position in order to functionally achieve the same effect as an opened fourth switching element. A neutral position of the primary transmission here is to be understood to mean that there is no force-fit between the transmission input and the transmission output of the primary transmission. A rotating movement of the transmission input is thus not transmitted to the transmission output. Moreover, with a switched-off primary drive element and an opened fourth switching element, and with a closed third switching element, the primary drive element can be started by the motorized operation of the second additional drive element.

The disclosure furthermore relates to an agricultural vehicle, for example a tractor or hauler, comprising a power-split axle drive, for example a power-split axle drive as disclosed herein. The agricultural vehicle according to the disclosure has the above-described advantages of the power-split axle drive according to the disclosure. Moreover, the agricultural vehicle is distinguished by an improved maneuverability by virtue of smaller turning radii, this being advantageous when driving on headlands of fields. The steering assistance also contributes toward improved comfort.

In an embodiment of the disclosure, the power-split axle drive is configured for driving the vehicle, for example for selectively driving the first and/or the second vehicle axle. For example, at least the second vehicle axle by a rotating movement and/or force and/or a torque of the primary drive element is able to be driven by way of the primary transmission. The first vehicle axle here can be a steerable front axle, and/or the second vehicle axle can be a rear axle.

In an embodiment of the disclosure, the control device is specified for determining different operating modes of the agricultural vehicle, for example of the power-split axle drive. It is conceivable here that an operating mode is selectable by an operator of the agricultural vehicle as a function of the driving situation and/or is predefined for the control device. Additionally, or alternatively, an operating mode can be determined as a function of the activation of one of the actuators and/or components of the power-split axle drive.

The disclosure furthermore relates to a method for operating a power-split axle drive, for example a power-split axle drive as disclosed herein. The power-split axle drive can comprise a first additional drive element, a first vehicle axle, a second vehicle axle, and a primary drive element for providing a torque which by a first shaft is transmitted to a primary transmission. The primary transmission is connected to the second vehicle axle, and at least the second vehicle axle, by way of the primary transmission, is driven by the torque of the primary drive element. The power-split axle drive furthermore has a power-splitting transmission, the power-splitting transmission by way of a first gear set being connected to the second vehicle axle and the primary transmission, and by way of a second shaft being connected to the first vehicle axle.

The first additional drive element, for introducing a torque, is connected to the power-splitting transmission by way of a first switching element. In other words, the method comprises a step of the first additional drive element acting on the power-splitting transmission, wherein a rotating movement and/or a force and/or a torque from the first additional drive element is introduced into the power-splitting transmission, as a result of which a rotating movement, or an introduced torque, respectively, introduced by a primary transmission, and/or for example the second vehicle axle, is superimposed in such a manner that a lead motion of the second vehicle axle is changed. The method according to the disclosure has the above-described advantages of the power-split axle drive according to the disclosure.

In an embodiment of the disclosure, the method comprises a step of feedback-controlling a lead motion of the first vehicle axle as a function of a steering angle of one of the vehicle axles, for example of the first vehicle axle, or of the first and the second vehicle axle relative to each other. The lead motion here can be increased or decreased as required, as described at the outset.

Moreover, the power-split axle drive according to the disclosure and/or the agricultural vehicle according to the disclosure can comprise the control device. The method according to the disclosure may likewise be able to be carried out by the control device. The control device can be an electronic module and/or an embedded system, and/or comprise a memory module and/or a processor. The control device can be connected to the first and/or the second additional drive element and/or the secondary output and/or the storage element and/or the first and/or the second and/or the third and/or the fourth switching element and/or the primary drive element and/or the primary transmission and/or the power-splitting transmission and/or the first and/or the second brake, for example connected for signaling and/or transmitting signals and/or conducting data. A connection for signaling and/or transmitting signals and/or conducting data here is to be understood to mean that an exchange of signals takes place between the connected components. The signals are processed in the control device and thus serve for controlling and/or feedback-controlling and actuating the components that are connected to one another for signaling and/or transmitting signals and/or conducting data. The connection can be implemented so as to be wire-bound, thus for example by cable, and/or wirelessly, thus by radio, for example using Bluetooth. The communications bus can be, for example Isobus, CAN-bus, or similar. Moreover, a further control device may be able to be controlled and/or feedback-controlled by the control device. The further control device (ECU=electronic control unit or ECM=electronic control module) can be configured like the control device. The control device can be assigned to the vehicle, for example be disposed on the vehicle, or be assigned to the power-split axle drive, or the power-split axle drive can comprise the control device. The control device can also be configured in two parts, for example as part of the vehicle and as part of the power-split axle drive. Moreover, the primary drive element for providing a torque, and/or the primary transmission and/or the power-splitting transmission and/or the first and/or the second additional drive element and/or the secondary output and/or the storage element and/or the first and/or the second and/or the third and/or the fourth switching element and/or the first and/or the second brake may be able to be set and/or adjusted, and/or for example able to be controlled and/or feedback-controlled, by the control device. The control device can be connected directly to the input and output unit which is disposed in a cab of the vehicle and by way of which data entered by an operator can be transmitted to the control device, or be received and emitted by the latter. However, it is also conceivable that the control device by way of a superordinate control unit is indirectly connected to the input and output unit.

The power-split axle drive can comprise a first actuator and/or a second actuator and/or a third actuator and/or a fourth actuator and/or a fifth actuator and/or a sixth actuator. The first switching element can be assigned the first actuator, and/or the second switching element can be assigned the second actuator, and/or the third switching element can be assigned the third actuator, and/or the fourth switching element can be assigned the fourth actuator, and/or the first brake can be assigned the fifth actuator, and/or the second brake can be assigned the sixth actuator. The first and/or the second and/or the third and/or the fourth and/or the fifth and/or the sixth actuator can be connected to the control device, for example connected for signaling and/or transmitting signals and/or conducting data. The first and/or the second and/or the third and/or the fourth and/or the fifth and/or the sixth actuator may be able to be activated, for example able to be closed, by the control device.

The above and other features will become apparent from the following detailed description and accompanying drawings.

BRIEF DESCRIPTION OF THE DRAWINGS

The disclosure as well as further advantages and advantageous developments and refinements of the disclosure, in terms of the hardware as well as the method, will be explained in more detail below by means of exemplary embodiments and with reference to the drawing. Functionally equivalent or comparable components here are provided with the same reference signs. In the schematic drawings.

DETAILED DESCRIPTION

The embodiments or implementations disclosed in the above drawings and the following detailed description are not intended to be exhaustive or to limit the present disclosure to these embodiments or implementations.

Figure 1:
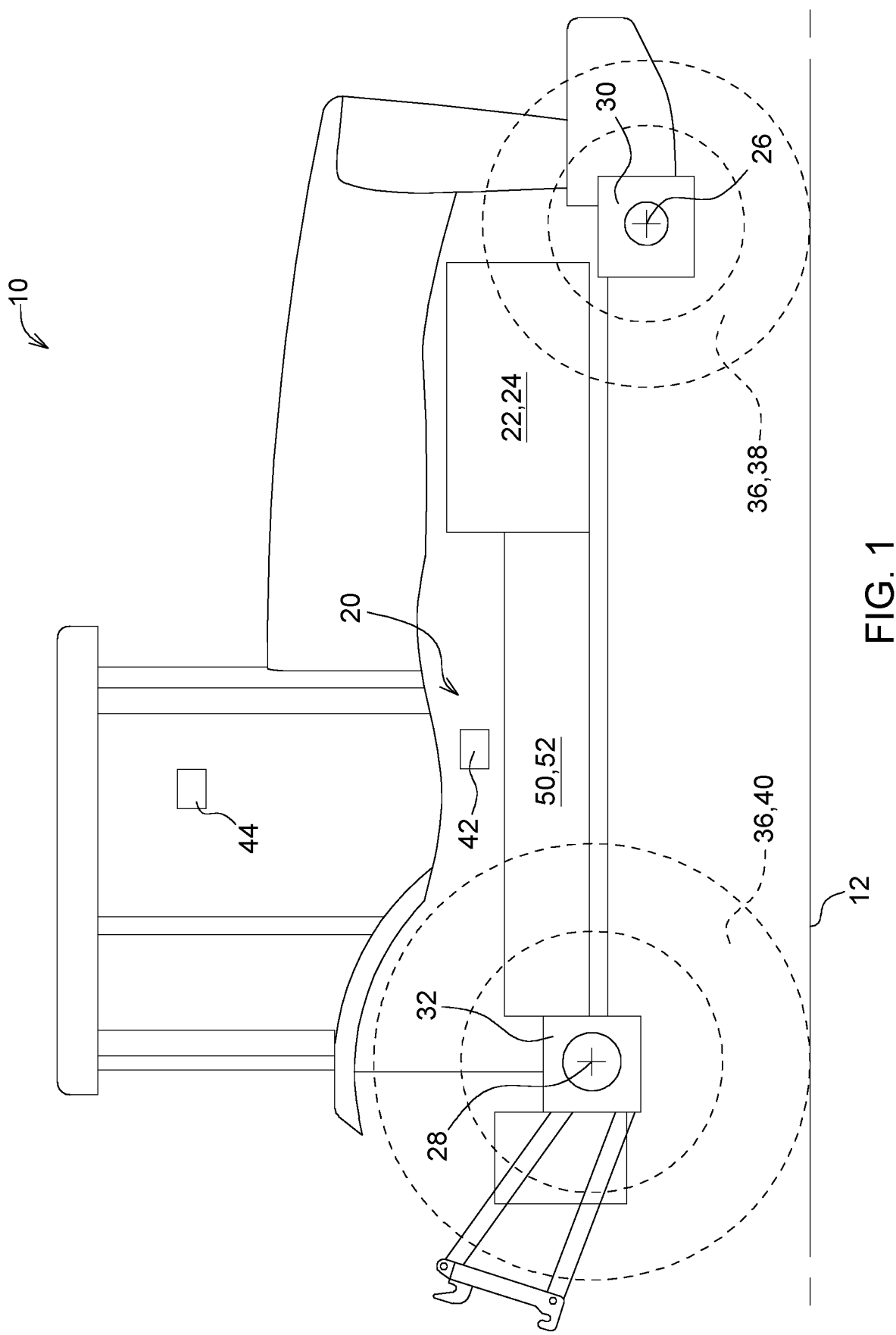
FIG. 1 shows a schematic illustration of a first exemplary embodiment of an agricultural vehicle according to the disclosure, with a first exemplary embodiment of a power-split axle drive according to the disclosure.

FIG. 1 shows a schematic illustration of a first exemplary embodiment of an agricultural vehicle 10 according to the disclosure, here for example of a tractor or hauler, having a first exemplary embodiment of a power-split axle drive 20 according to the disclosure. The agricultural vehicle 10 comprises the power-split axle drive 20. The power-split axle drive 20 comprises a primary drive element 22, a primary transmission 24, a first vehicle axle 26 and a second vehicle axle 28. The primary drive element 22 can be embodied as an internal combustion engine or as an electric motor, for example as a combustion engine. The first vehicle axle 26 can be a front axle, and the second vehicle axle 28 can be a rear axle. Moreover, the first vehicle axle 26 can be embodied as a steerable axle. The power-split axle drive 20 can moreover comprise a first differential 30, thus for example a front axle differential. The first vehicle axle 26 can be connected to the first differential 30, for example connected so as to be drivable. The power-split axle drive 20 can moreover comprise a second differential 32, thus for example a rear axle differential. The second vehicle axle 28 can be connected to the second differential 32, for example connected so as to be drivable.

A rotating movement and/or force and/or a torque of the primary drive element 22 by way of the primary transmission 24 may be able to be transmitted at different gear ratios to the first and/or the second vehicle axle 26, 28. The first and/or the second vehicle axle 26, 28 convert/converts a rotating movement and/or force and/or a torque of the primary drive element 22 into a rotating movement and/or force and/or a torque of one or a plurality of ground engagement means 36, and thus into a propulsion of the vehicle 10. The vehicle 10 can have one or a plurality of ground engagement means 36, here illustrated in the form of wheels 38, 40, which engage with a hard ground 12 so as to transmit traction forces, and/or by way of which the vehicle 10 is supported on the hard ground 12. The vehicle 10 can moreover have a chassis (not illustrated), wherein the chassis can for example be supported by the wheels 38, 40 suspended on the first and/or the second vehicle axle 28, 30. A first pair of wheels 38 are for example disposed on the first vehicle axle 26, and a second pair of wheels 40 are for example disposed on the second vehicle axle 28. The diameters of the wheels 38, 40 here can differ from one another; for example, the diameter of the first pair of wheels 38 can be smaller than the diameter of the second pair of wheels 40. Alternatively, the ground engagement means 36 can also be configured and disposed as tracks.

Moreover, the power-split axle drive 20 and/or the vehicle 10 can comprise a control device 42. The control device 42 can be connected directly to an input and output unit 44 which is disposed in a cab of the vehicle and by way of which data entered by an operator can be transmitted to the control device 42, or be received and emitted by the latter.

Figure 2:
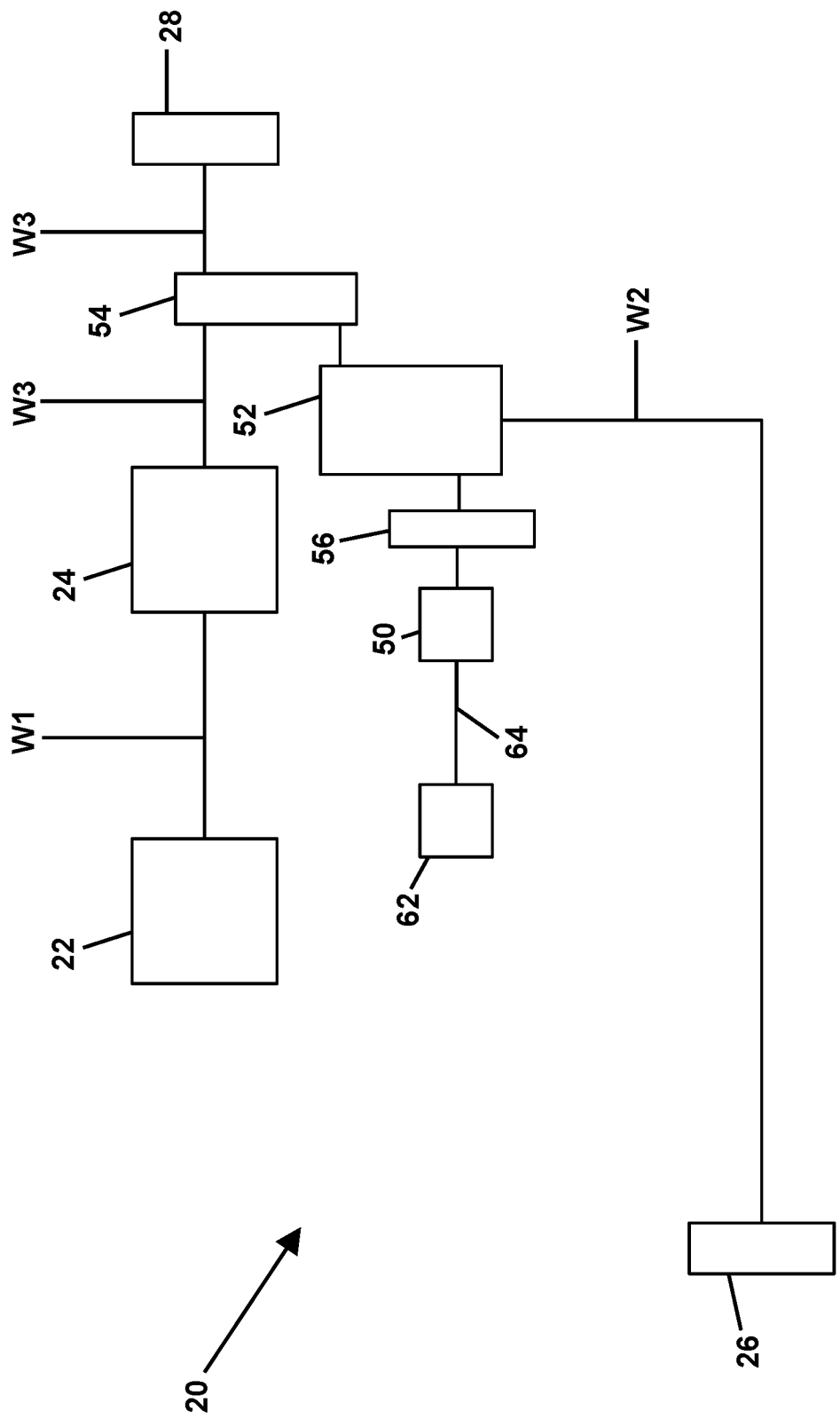
FIG. 2 shows a schematic illustration of the first exemplary embodiment of the power-split axle drive according to the disclosure.

FIG. 2 shows a schematic illustration of the first exemplary embodiment of the power-split axle drive 20 according to the disclosure. The axle drive 20 shown in FIG. 2 corresponds substantially to the power-split axle drive 20 shown in FIG. 1, and therefore only details and/or points of differentiation will be discussed below. The agricultural vehicle 10 can comprise the power-split axle drive 20, as is illustrated in FIG. 2. The power-split axle drive 20 for an agricultural vehicle 10 comprises a first additional drive element 50, the first vehicle axle 26, the second vehicle axle 28, and the primary drive element 22 for providing a rotating movement and/or a force and/or a torque which by way of a first shaft W1 is able to be transmitted to the primary transmission 24. The primary transmission 24 by or by way of the first shaft W1 is thus connected to the primary drive element 22, for example connected so as to be drivable. The second vehicle axle 28 is connected to the primary transmission 24, for example connected so as to be drivable. The second vehicle axle 28, at least by way of the primary transmission 24, here is able to be driven by the rotating movement and/or the force and/or the torque of the primary drive element 22. For example, the second vehicle axle 28 by way of or by a third shaft W3 is connected to the primary transmission 24, for example connected so as to be drivable. In other words, by way of the primary drive element 22 a rotating movement and/or a force and/or a torque is thus able to be generated, which by way of the first shaft W1 is able to be introduced into or transmitted to the primary transmission 24 and from the primary transmission 24 into or to the second vehicle axle 28. The power-split axle drive 20 furthermore comprises a power-splitting transmission 52. The power-splitting transmission 52 by way of or by a first gear set 54 is connected to the third shaft W3, for example connected so as to be drivable. By the first gear set 54 a rotating movement and/or a torque from the primary drive element 22 can thus be transmitted to the primary transmission 24 to the third shaft W3 and transmitted to or introduced into the power-splitting transmission 52. Moreover, the first vehicle axle 26 by way of or by a second shaft W2 is connected to the power-splitting transmission 52, for example connected so as to be drivable.

The first additional drive element 50 by way of a first switching element 56, or by a first switching element 56, is able to be connected to the power-splitting transmission 52, for example able to be releasably connected, such as able to be connected in a releasably, rotationally fixed and/or releasably driven manner. A non-activated first switching element 56 hereunder is to be understood to mean an opened first switching element 56. This means that no rotating movement and/or no force and/or no torque of the first additional drive element 50 by or by way of the first switching element 56 is able to be transmitted to or introduced into the power-splitting transmission 52, and/or vice versa. With an activated, for example closed, first switching element 56, a rotating movement and/or a force and/or a torque of the first additional drive element 50, by or by way of the first switching element 56 may be able to be transmitted to or introduced into the power-splitting transmission 52, and/or conversely from the power-splitting transmission 52 be able to be transmitted to the first additional drive element. Moreover, the first additional drive element 50 can be operated in a generative or motorized manner.

The power-split axle drive 20 can also comprise a storage element 62. The storage element 62 is optionally provided here. The first additional drive element 50 in terms of electronic power can be connected to the storage element 62 by way of a connecting line 64. One or a plurality of operating modes can be implemented by the power-split axle drive, for example also the vehicle.

In a driving operation or coasting operation of the vehicle 10 and/or of the power-split axle drive 20, the primary drive element 22 generates a rotating movement and/or a force and/or a torque which is introduced into the primary transmission 24 by way of the first shaft W1. The rotating movement and/or a force and/or a torque introduced into the primary transmission 24 imparts a positive gearing in the primary transmission 24, to the extent that a gear ratio or a driving position has been engaged. The location where a rotating movement and/or a force and/or a torque is introduced into the primary transmission 24 is referred to as the transmission input, wherein the location where, taking into account the gearing ratio, a resultant rotating movement and/or a resultant force and/or a resultant torque prevails, is referred to as the transmission output. In the example shown in FIG. 2, the transmission input and the transmission output of the primary transmission 24 are disposed so as to be mutually opposite. The prevailing rotating movement and/or the prevailing force and/or the prevailing torque in the case of an engaged gear ratio or driving position, by way of the third shaft W3 at the transmission output of the primary transmission 24 is introduced into the second vehicle axle 28. Moreover, the rotating movement and/or the force and/or the torque of the primary drive element 22 by way of the primary transmission 24 is introduced into or transmitted to the power-splitting transmission 52 by the second shaft W2 by way of the first gear set 54.

In the "generator" operating mode, the first additional drive element 50, for example in the driving or coasting operation, can be operated in the generative manner for charging the storage element 62. In the generative operation of the first additional drive element 50, for example with an activated, for example closed, first switching element 56, the rotating movement and/or force and/or the torque introduced from the primary drive element 22 into the power-splitting transmission 52 is introduced into or transmitted to the first additional drive element 50, and electric energy is generated by the first additional drive element and supplied to the storage element 62.

Likewise, the "lead motion" operating mode can be implemented in that the first additional drive element 50 is operated in a motorized manner. As a result, an additional rotating movement and/or an additional force and/or an additional torque of the first additional drive element 50 by way of the closed first switching element 56 can be transmitted to the power-splitting transmission 52. The rotating movement and/or force transmitted to the power-splitting transmission 52 and/or the transmitted torque of the primary drive element 22, and the rotating movement and/or force transmitted to the power-splitting transmission 52, and/or the transmitted torque of the first additional drive element 50 can be superimposed by the power-splitting transmission 52, and a resultant rotating movement and/or a resultant force and/or a resultant torque may be able to be transmitted to the first vehicle axle 26. In this way, a lead motion of the first vehicle axle 26 may advantageously be able to be set, for example be able to be controlled and/or feedback-controlled. The first additional drive element 50 thus acts on the power-splitting transmission 52 in such a manner that the first additional drive element 50 introduces a rotating movement and/or a force and/or a torque into the power-splitting transmission 52, which by a rotating movement and/or force introduced by the primary drive element 22 into the power-splitting transmission 52 by way of the primary transmission and/or an introduced torque is superimposed in such a manner that a lead motion of the first vehicle axle is changed.

Figure 3:
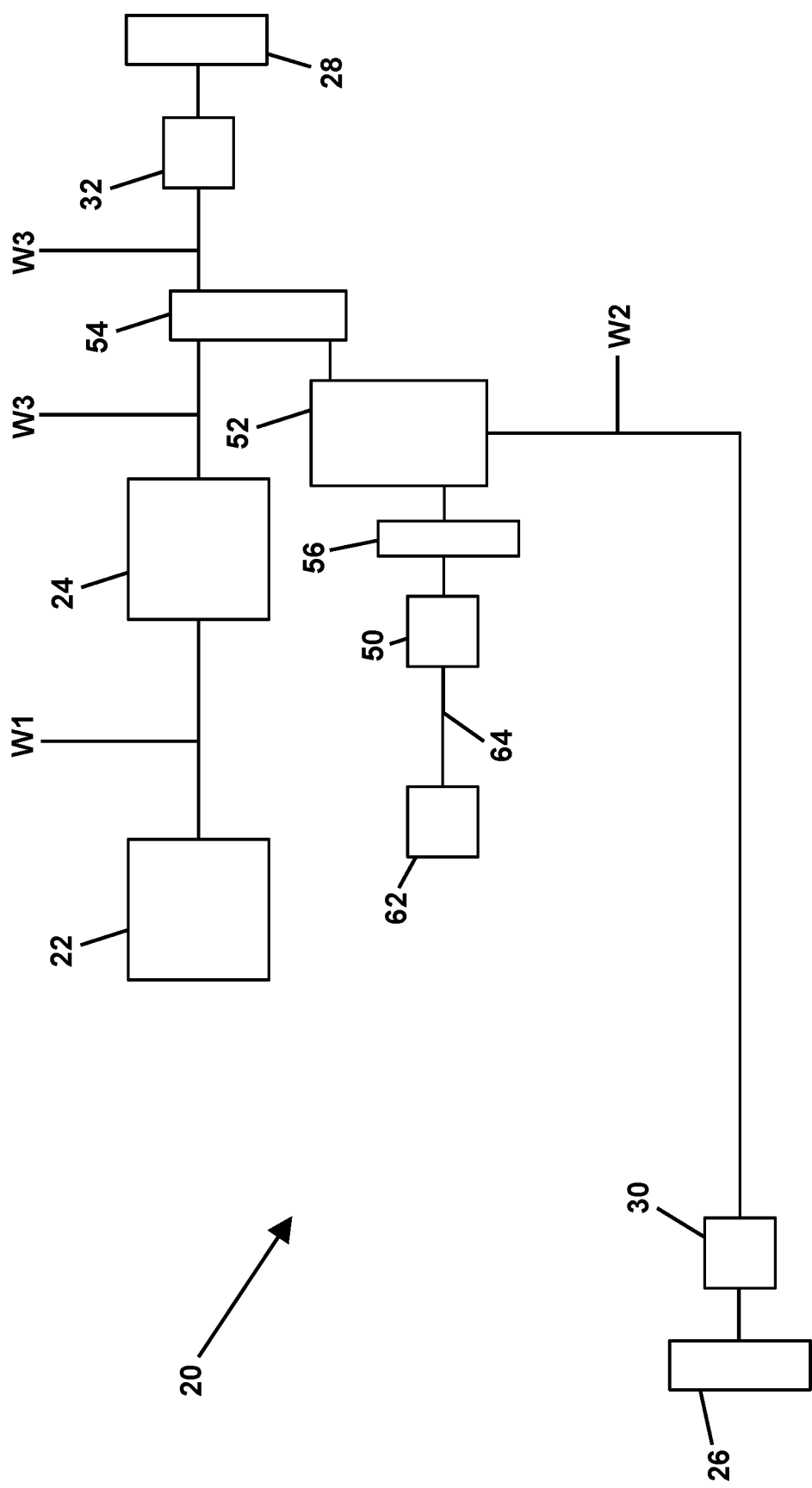
FIG. 3 shows a schematic illustration of a second exemplary embodiment of the power-split axle drive according to the disclosure.

FIG. 3 shows a schematic detailed illustration of a second exemplary embodiment of the power-split axle drive 20 according to the disclosure. The axle drive 20 shown in FIG. 3 corresponds substantially to the power-split axle drive 20 shown in FIGS. 1 and 2, and therefore only details and/or points of differentiation will be discussed below. The agricultural vehicle 10 can comprise the power-split axle drive 20, as is illustrated in FIG. 3. The power-split axle drive 20 comprises a first differential 30, for example a front axle differential. The first differential 30, by way of the second shaft W2 or by the second shaft W2, is connected to the power-splitting transmission 52, for example connected so as to be drivable. As a result, a rotating movement and/or a force and/or a torque of the power-splitting transmission 52 by the first differential 30 or by way of the first differential 30 may be able to be introduced into or transmitted to the first vehicle axle 26. Conversely, a rotating movement and/or a force and/or a torque of the first vehicle axle 26, by the first differential 30 or by way of the first differential 30, may also be able to be introduced into or transmitted to the power-splitting transmission 52. The power-split axle drive 20 comprises a second differential 32, for example a rear axle differential. The second differential 32, by way of the third shaft W3 or by the third shaft W3, is connected to the primary transmission 24, for example connected so as to be drivable. As a result, a rotating movement and/or a force and/or a torque of the primary transmission 24 by the second differential 32 or by way of the second differential 32 may be able to be introduced into or transmitted to the second vehicle axle 28. The first differential 30 and the second differential 32 are optionally provided.

Figure 4:
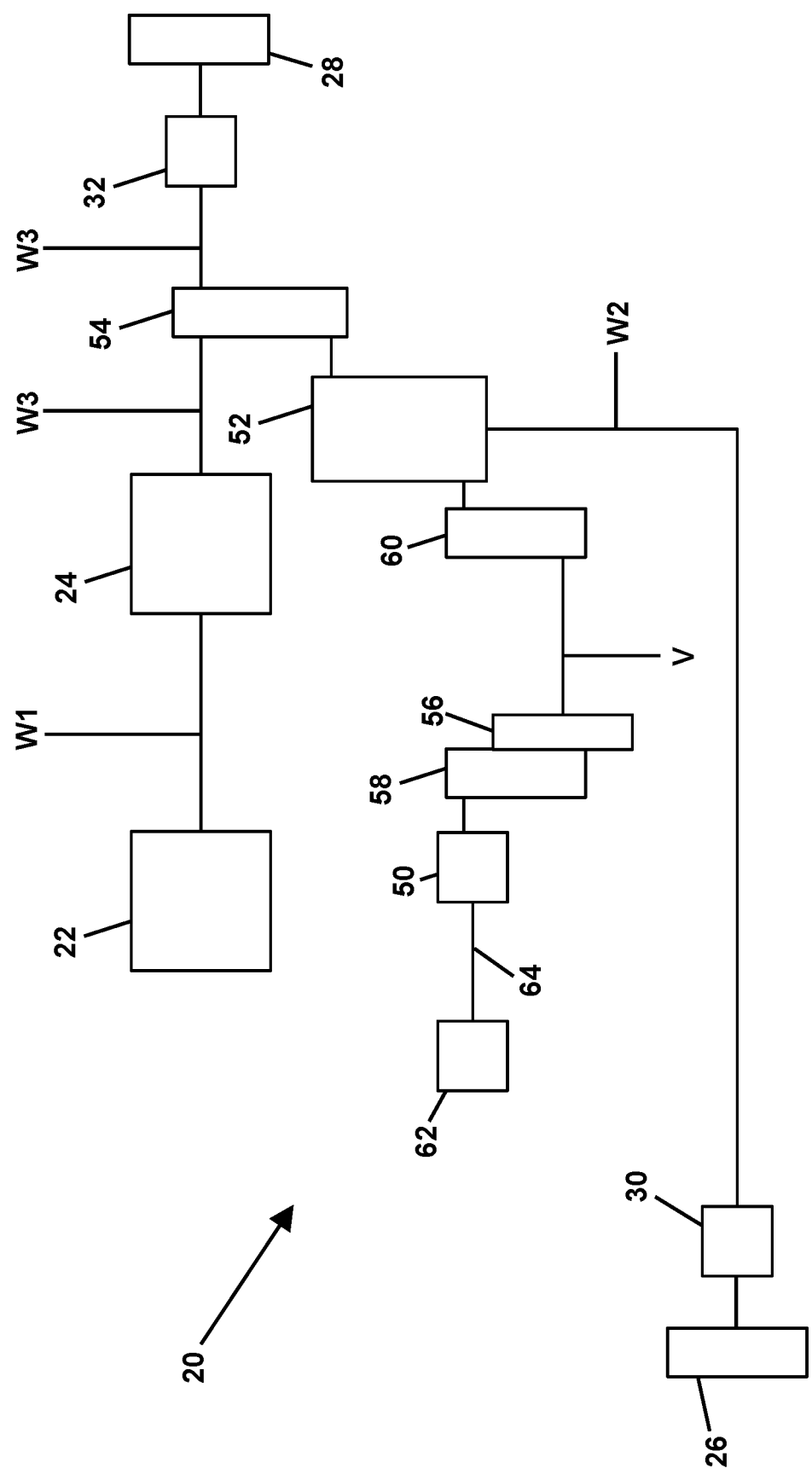
FIG. 4 shows a schematic illustration of a third exemplary embodiment of the power-split axle drive according to the disclosure.

FIG. 4 shows a schematic detailed illustration of a third exemplary embodiment of the power-split axle drive 20 according to the disclosure. The power-split axle drive 20 shown in FIG. 4 corresponds substantially to the power-split axle drive 20 shown in FIGS. 1 to 3, and therefore only details and/or points of differentiation will be discussed below. The agricultural vehicle 10 can comprise the power-split axle drive 20, as is illustrated in FIG. 4. The power-split axle drive 20 additionally comprises a layshaft V. The first additional drive element 50 by way of the first switching element 56 or by the first switching element 56 is able to be connected to the layshaft V, for example connected so as to be drivable. Likewise, the power-splitting transmission 52 is connected to the layshaft V, for example connected so as to be drivable. Moreover, the power-split axle drive 20 comprises a second gear set 58. The first switching element 56 here, by way of the second gear set 58 or by the second gear set 58, is connected to the first additional drive element 50, for example connected so as to be drivable. The layshaft V by the first switching element 56 or by way of the first switching element 56 is able to be connected to the second gear set 58, for example able to be connected so as to be drivable. The first switching element 56 here is able to be activated, for example able to be closed, in such a manner that the second gear set 58 by way of the first switching element 56 or by the first switching element 56 is connected to the layshaft V, for example connected so as to be drivable. In other words, the first switching element 56 is able to be activated, for example able to be closed, in such a manner that a rotating movement and/or a force and/or a torque of the first additional drive element 50 can be transmitted to or introduced into the second gear set 58, and from the second gear set 58 transmitted to or introduced into the first switching element 56, and from the first switching element 56 onward to or into the layshaft V. Likewise, the first switching element 56 is not able to be activated, for example not able to be opened or is not opened, in such a manner that no rotating movement and/or no force and/or no torque of the first additional drive element 50 can be transmitted to or introduced into the layshaft V. The power-split axle drive 20 moreover comprises a third gear set 60. The power-splitting transmission 52 by way of or by the third gear set 60 is connected to the layshaft V, for example connected so as to be drivable. A rotating movement and/or a force and/or a torque from the layshaft V by the third gear set 60 can be transmitted to or introduced into the power-splitting transmission 52. As a result, a rotating movement and/or a force and/or a torque from the first additional drive element 50 by way of the second gear set 58 may be able to be transmitted to the first switching element 56, and from the first switching element 56 to the layshaft V, and from the layshaft V by way of the third gear set 60 or by the third gear set 60 to the power-splitting transmission 52. The rotating movement and/or force and/or the torque may then be able to be transmitted from the power-splitting transmission 52, for example by way of the first differential 30, to the first vehicle axle 26, for example. In the "generator" operating mode, thus in the driving or coasting operation, and in the generative operation of the first additional drive element 50, with a closed first switching element 56, the rotating movement and/or force and/or the torque introduced into the power-splitting transmission 52 from the primary drive element 22, from the power-splitting transmission 52 by way of the third gear set 60 and the layshaft V and the first switching element 56 and the second gear set 58 is then introduced into or transmitted to the first additional drive element 50, and electric energy is generated by the first additional drive element 50. The electrically generated energy can be supplied to the storage element 62. In the "lead motion" operating mode, thus in the driving or coasting operation and the motorized operation of the first additional drive element 50, an additional rotating movement and/or an additional force and/or an additional torque of the first additional drive element 50 is transmitted from the first additional drive element 50 by way of the second gear set 58 and the closed first switching element 56 to the layshaft V, and from the layshaft V by way of the third gear set 60 transmitted to the power-splitting transmission 52, and by the power-splitting transmission 52 superimposed with the rotating movement and/or the force and/or the torque of the primary drive element 22. The resultant rotating movement and/or force and/or the resultant torque from the power-splitting transmission 52 are transmitted to the first vehicle axle 26 by the second shaft W2. In this way, the first additional drive element 50 can advantageously act on the power-splitting transmission 52, as a result of which a lead motion of the first vehicle axle 26 is able to be feedback-controlled.

Figure 5:
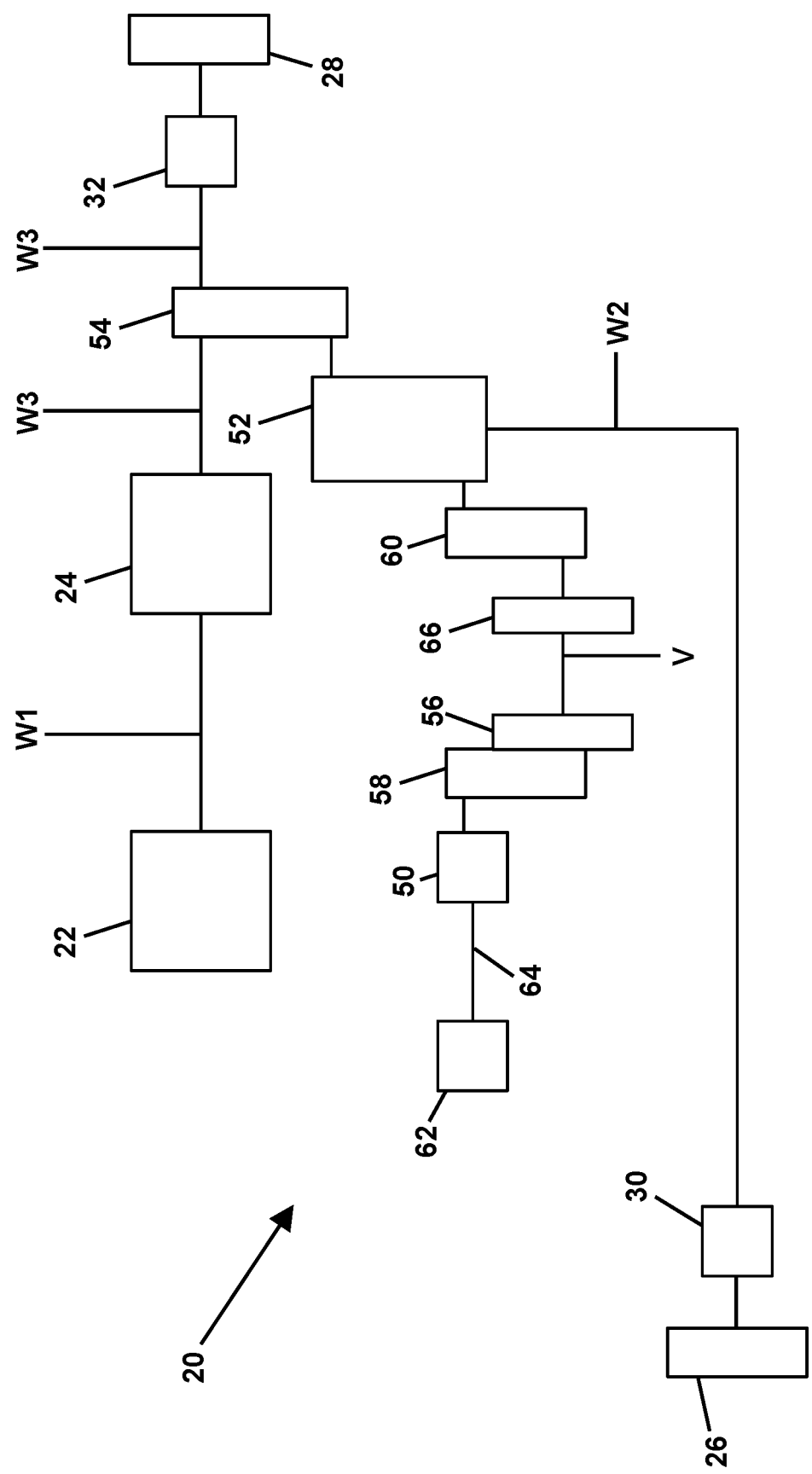
FIG. 5 shows a schematic illustration of a fourth exemplary embodiment of the power-split axle drive according to the disclosure.

FIG. 5 shows a schematic illustration of a fourth exemplary embodiment of the power-split axle drive 20 according to the disclosure. The axle drive 20 shown in FIG. 5 corresponds substantially to the power-split axle drive 20 shown in FIGS. 1 to 4, and therefore only details and/or points of differentiation will be discussed below. The agricultural vehicle 10 can comprise the power-split axle drive 20, as is illustrated in FIG. 5. The power-split axle drive 20 additionally comprises a first brake 66. The first brake 66 is disposed between the first additional drive element 50 and the power-splitting transmission 52. The first brake 66 is connected in a rotationally fixed manner to the layshaft V. The layshaft V is able to be releasably held in relation to rotation by the first brake 66. The layshaft V by the first brake 66 here may be able to be releasably connected to a transmission housing or a frame, for example. This is advantageous for example, when, for example, a driving state in the all-wheel operation is desired, in which a rigid connection between the first vehicle axle 26 and the second vehicle axle 28 is required. In this case, the first additional drive element 50 does not have to permanently build up a counter moment and thus consume electric energy.

Figure 6:
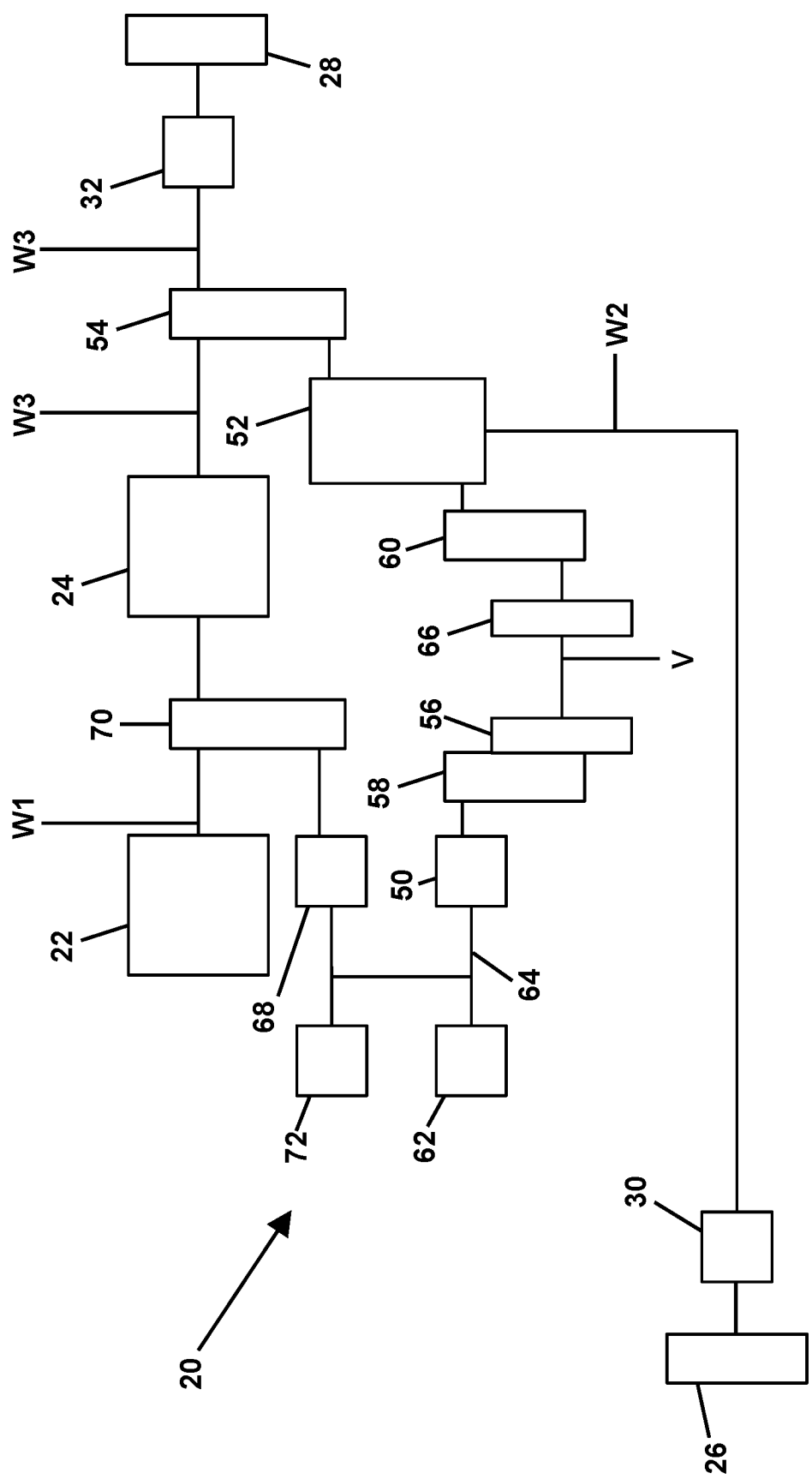
FIG. 6 shows a schematic illustration of a fifth exemplary embodiment of the power-split axle drive according to the disclosure.

FIG. 6 shows a schematic illustration of a fifth exemplary embodiment of the power-split axle drive 20 according to the disclosure. The axle drive 20 shown in FIG. 6 corresponds substantially to the power-split axle drive 20 shown in FIGS. 1 to 5, and therefore only details and/or points of differentiation will be discussed below. The agricultural vehicle 10 can comprise the power-split axle drive 20, as is illustrated in FIG. 6. The power-split axle drive 20 comprises a second additional drive element 68.

The second additional drive element 68 is connected to the primary drive element 22 by way of or by the first shaft W1, for example connected so as to be drivable. The torque able to be generated by the primary drive element 22 and/or the force able to be generated and/or the rotating movement able to be generated is able to be introduced into or transmitted to the second additional drive element by way of a gearing stage 70, for example a fourth gear set. The second additional drive element 68, in terms of electronic power, is connected to the storage element 62 and to the first additional drive element 50 by way of the connecting line 64. Moreover, the second additional drive element 68, in terms of electronic power, is connected to a secondary output 72 by way of the connecting line 64. The secondary output 72 here, like the storage element 62, is optionally provided. This means that a secondary output 72 does not mandatorily have to be provided. Moreover however, embodiments having more than one secondary output 72 are also conceivable. As already mentioned, generated electric energy, or stored electric energy, can be supplied to the storage element 62 or be retrieved, or by way of the connecting line 64 be supplied to the consumers, for example the first additional drive element 50, the secondary output 72, and/or the second additional element 68. The rotating movement generated by the primary drive element 22, or the force generated and/or the torque generated, respectively, will be introduced into the second additional drive element 68 and/or the primary transmission 24 for example by the gearing stage 70, for example the fourth gear set, and/or the first shaft W1. In this case, the second additional drive element 68 can be generatively operated, which means that the energy introduced for example by the gearing stage 70, for example the fourth gear set, and/or the first shaft W1, in the form of the rotating movement and/or the force and/or the torque is converted into electric energy. This electric energy can be used for operating the (electric) secondary output 72, and/or electric energy can be stored in the optional storage element 62, and/or the first additional drive element 50 can be operated in a motorized manner so as to increase the lead motion of the first vehicle axle 26. To the extent that the second additional drive element 68 is operated in a generative manner, electric energy is generated. Said electric energy can be used for operating the secondary output 72 and/or be stored in the storage element 62. For charging the storage element 62, for example, the first additional drive element 50 and/or the second additional drive element 68 can however also be operated in a generative manner, for example in the driving or coasting operation. To this end, a rotating movement and/or a force and/or a torque by the primary drive element 22 can be introduced into or transmitted to the second additional drive element 68, and by way of the primary transmission 24 can be introduced into or transmitted to the power-splitting transmission 52 in the first additional drive element 50. In addition to the rotating movement and/or force and/or torque introduced by the primary drive element 22, the second additional drive element 68 can likewise introduce a rotating movement and/or force and/or torque into the first shaft W1, for example by way of the gearing stage, for example the fourth gear set. To this end, the second additional drive element 68 can be operated in a motorized manner. In this way, an increase of the drive output can briefly take place, for example, to the extent that this is required by the respective driving state.

Figure 7:
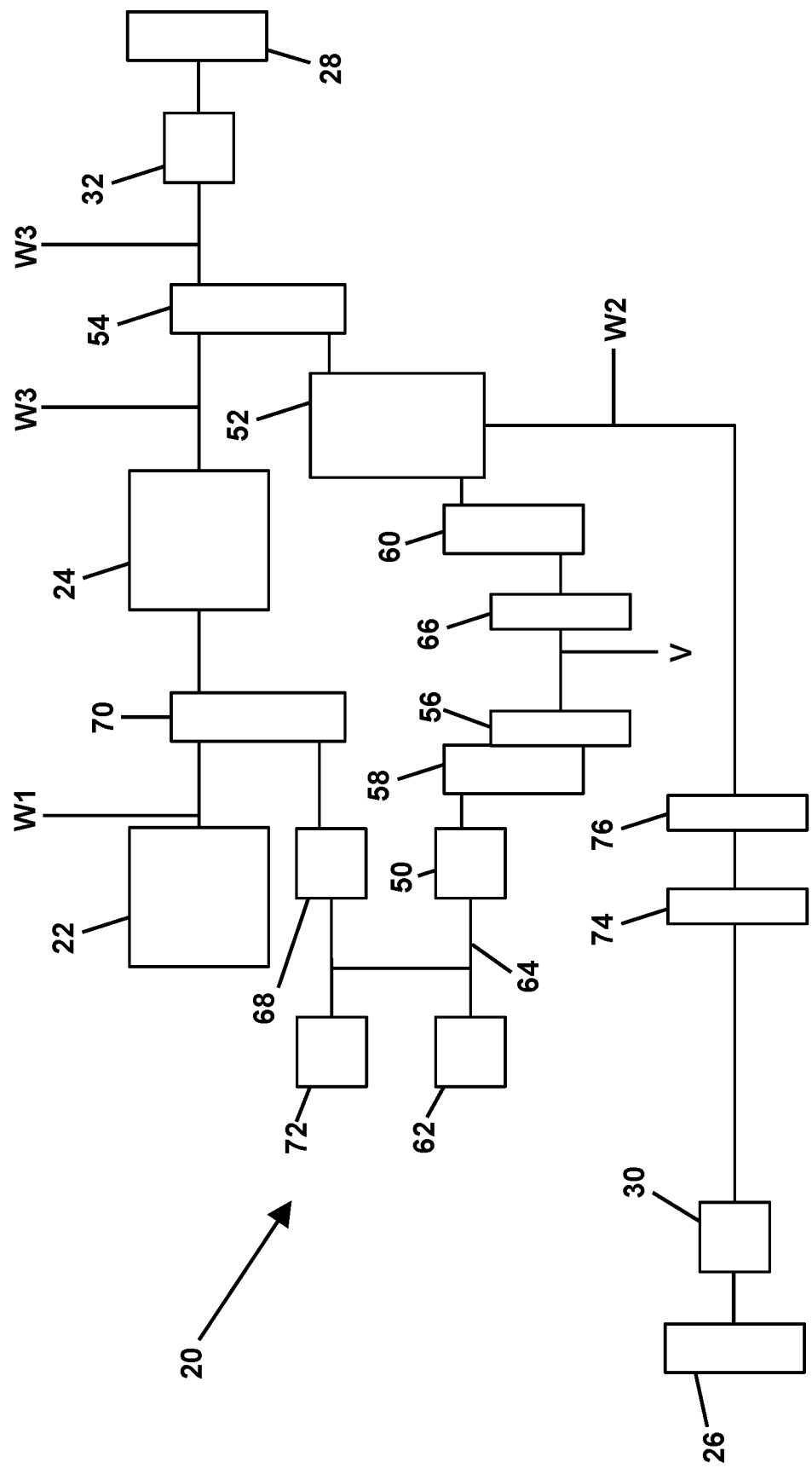
FIG. 7 shows a schematic illustration of a sixth exemplary embodiment of the power-split axle drive according to the disclosure.

FIG. 7 shows a schematic illustration of a sixth exemplary embodiment of the power-split axle drive 20 according to the disclosure. The axle drive 20 shown in FIG. 7 corresponds substantially to the power-split axle drive 20 shown in FIGS. 1 to 6, and therefore only details and/or points of differentiation will be discussed below. The agricultural vehicle 10 can comprise the power-split axle drive 20, as is illustrated in FIG. 7. A second switching element 74 and a second brake 76 are disposed on or at the second shaft W2. The second switching element 74 and the second brake 76 are disposed between the power-splitting transmission 52 and the first vehicle axle 26. The second switching element 74 here is disposed between the second brake 76 and the first vehicle axle 26. The power-splitting transmission 52, by way of the second switching element 74 or by the second switching element 74, is able to be connected to the first vehicle axle 26, and for example the first differential 30, for example able to be releasably connected, such as able to be connected in a releasable, rotationally fixed and/or releasably drivable manner. The second brake 76 is disposed between the second switching element 74 and the power-splitting transmission 52. The second brake 76 is disposed on the second shaft W2. The second shaft W2 by the second brake 76 is able to be releasably held in relation to rotation, for example by a transmission housing or a frame. As a result, the second shaft W2 can be held or inhibited in relation to a rotating movement. With the power-split axle drive, the above-described operating modes, the "fully electric" operating mode, the "parking brake" operating mode and the "vehicle axle brake" operating mode, can be implemented by the second brake 76 and the second switching element 74. The second switching element 74 is configured as a second clutch. The second switching element 74 on one side can be connected in a rotationally fixed manner to the second shaft W2, and on another side able to be connected to another part of the second shaft W2, and thus to the power-splitting transmission 52. The second brake 76 on one side can be connected to the second shaft W2, and on another side connected to the transmission housing or the frame, for example. As a result, the second shaft W2 can be inhibited and/or held in relation to a rotating movement.

Figure 8:
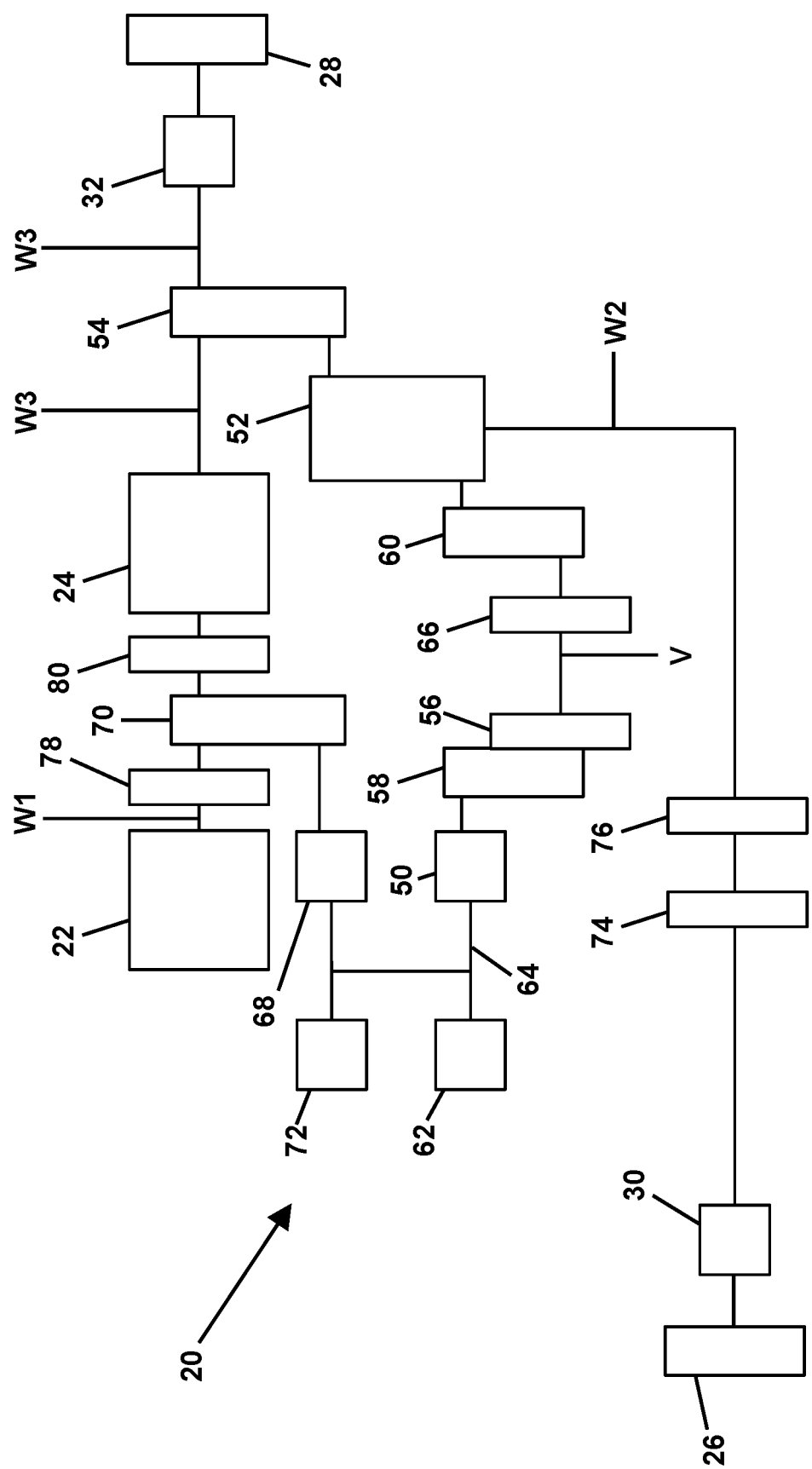
FIG. 8 shows a schematic illustration of a seventh exemplary embodiment of the power-split axle drive according to the disclosure.

FIG. 8 shows a schematic illustration of a seventh exemplary embodiment of the power-split axle drive 20 according to the disclosure. The axle drive 20 shown in FIG. 8 corresponds substantially to the power-split axle drive 20 shown in FIGS. 1 to 7, and therefore only details and/or points of differentiation will be discussed below. The agricultural vehicle 10 can comprise the power-split axle drive 20, as is illustrated in FIG. 8. A third switching element 78 is disposed between the primary drive element 22 and the second additional drive element 68, and/or the primary drive element 22 and the primary transmission 24. Likewise, a fourth switching element 80 is disposed between the primary transmission 24 and the primary drive element 22, and/or the primary transmission 24 and the second additional drive element 68. With an opened third switching element 78, the primary drive element 22 is decoupled from the power-split axle drive 20. No rotating movement and/or force and/or no torque from the primary drive element 22 can thus be introduced into or transmitted to the second additional drive element 68 and/or the primary transmission 24. Conversely, no rotating movement and/or force and/or no torque can likewise also be introduced into or transmitted to the primary drive element 22. In this case, a purely electric driving state would accordingly be able to be implemented only by the motorized operation of the first additional drive element 50 and/or of the second additional drive element 68. With a closed third switching element 78, the primary drive element 22 is connected to the power-split axle drive 20. A rotating movement and/or a force and/or a torque from the primary drive element 22 can thus be introduced into or transmitted to the second additional drive element 68 and/or the primary transmission 24. Conversely, a rotating movement and/or a force and/or a torque can likewise also be introduced into or transmitted to the primary drive element 22. With the opened fourth switching element 80, the primary transmission 24 is thus decoupled from the primary drive element 22 and/or the second additional drive element 68. This means that a mechanically introduced propulsion cannot be implemented by way of the primary transmission 24. No rotating movement and/or force and/or no torque from the primary transmission 24 can thus be introduced into or transmitted to the power-split axle drive. Moreover, with a switched-off primary drive element 22 and an opened fourth switching element 80, and with a closed third switching element 78, the primary drive element 22 can be started by the motorized operation of the second additional drive element 68. With the closed fourth switching element 80, the primary transmission 24 is thus connected to the primary drive element 22 and/or the second additional drive element 68, for example connected so as to be drivable. A rotating movement and/or a force and/or a torque from the primary transmission 24 can thus be introduced into or transmitted to the power-split axle drive.

Figure 9:
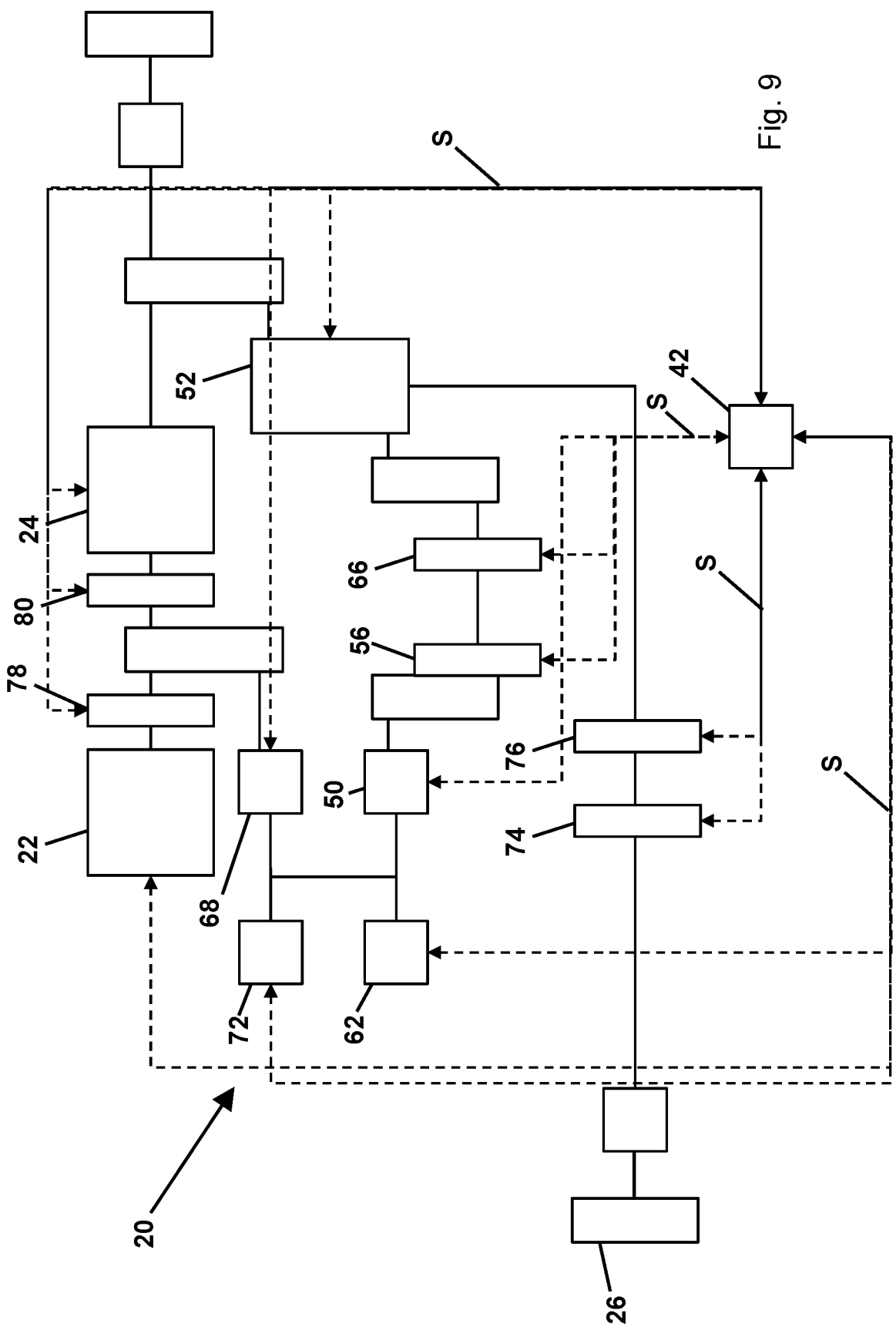
FIG. 9 shows a schematic illustration of an eighth exemplary embodiment of the power-split axle drive according to the disclosure.

FIG. 9 shows a schematic illustration of an eighth exemplary embodiment of the power-split axle drive 20 according to the disclosure. The axle drive 20 shown in FIG. 9 corresponds substantially to the power-split axle drive 20 shown in FIGS. 1 to 8, and therefore only details and/or points of differentiation will be discussed below. The agricultural vehicle 10 can comprise the power-split axle drive 20, as is illustrated in FIG. 9. The power-split axle drive 20 is assigned at least one control device 42; the power-split axle drive 20 can for example comprise the control device 42. The control device 42, by way of a plurality of control lines S, for example by way of bidirectional control lines, for controlling and/or feedback-controlling and/or actuating is connected to the first and/or the second additional drive element 50, 68 and/or the secondary output 72 and/or the storage element 62 and/or the first and/or the second and/or the third and/or the fourth switching element 56, 74, 78, 80 and/or the primary drive element 22 and/or the primary transmission 24 and/or the power-splitting transmission 52 and/or a first and/or a second brake 66, 76, and is for example connected to the aforementioned for signaling and/or transmitting signals and/or conducting data. The control device 42 is configured in such a manner that the power-split axle drive 20, for example the above-mentioned components of the power-split axle drive 20, are able to be actuated as a function of an operating mode of the power-split axle drive 20 and/or of the vehicle 10.

The above-mentioned operating modes "generator" and/or "lead motion" and/or "fully electric" and/or "parking brake" and/or "vehicle axle brake" can for example be able to be actuated by the control device 42.

Figure 10:
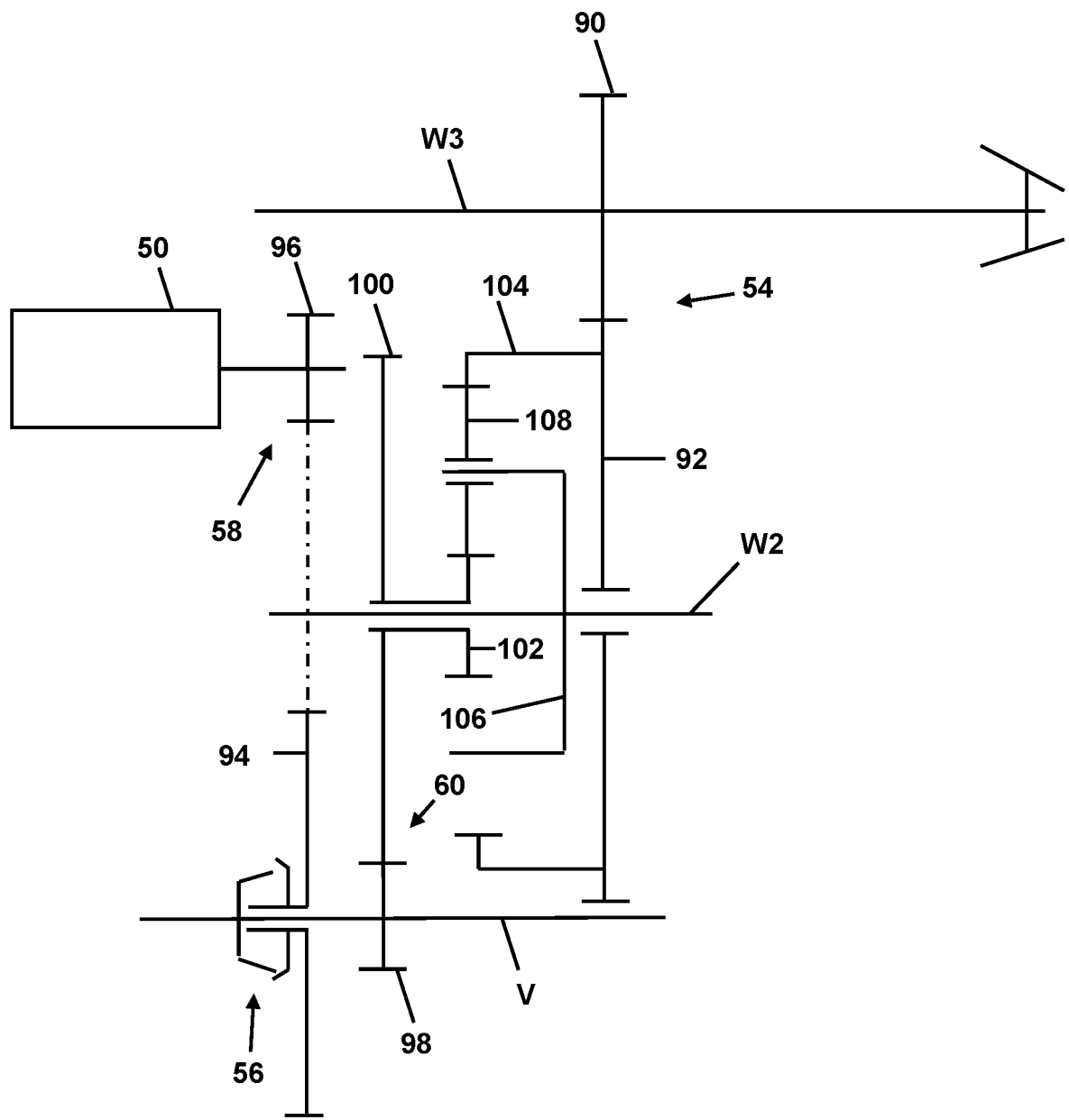
FIG. 10 shows a detailed schematic illustration of a ninth exemplary embodiment of the power-split axle drive according to the disclosure.

FIG. 10 shows a detailed schematic illustration of a ninth exemplary embodiment of the power-split axle drive 20 according to the disclosure, for example of the power-splitting transmission 52 and of the first additional drive element 50. The power-split axle drive 20 shown in FIG. 10 corresponds substantially to the power-split axle drive 20 shown in FIGS. 1 to 9, and therefore only details and/or points of differentiation will be discussed below. The agricultural vehicle 10 can comprise the power-split axle drive 20, as is illustrated in FIG. 10. The first gear set 54 comprises a first pair of gear wheels, for example a first and a second fixed gear 90, 92. The first fixed gear 90 is connected, for example in a rotationally fixed manner, to the third shaft W3, and the second fixed gear 92 to the power-splitting transmission 52. The first fixed gear 90 meshes with the second fixed gear 92, thus is for example in constant meshing engagement with said second fixed gear 92. The second gear set 58 comprises a second pair of gear wheels, for example a first shifting gear 94 and a third fixed gear 96. The third fixed gear 96 is connected to the first additional drive element 50, for example to an output shaft of the first additional drive element 50, for example connected so as to be drivable, such as connected in a rotationally fixed manner and/or so as to be drivable. The first shifting gear 94 is rotatably mounted on the layshaft V, for example mounted so as to be freely rotatable and/or axially displaceable on the layshaft V. The first shifting gear 94 is connected to one side of the first switching element 56, for example connected in a rotationally fixed manner and/or so as to be drivable. The first shifting gear 94 meshes with the third fixed gear 96, thus is for example in constant meshing engagement with said third fixed gear 96. The first switching element 56 by way of the first shifting gear 94 or by the first shifting gear 94, and by way of the third fixed gear 96 or by the third fixed gear 96, is thus connected to the first additional drive element 50, for example connected so as to be drivable. In turn, the layshaft V by the first switching element 56 or by way of the first switching element 56, and the first shifting gear 94, is connected to the third fixed gear 96, for example connected so as to be drivable, such as releasably drivably connected. The third gear set 60 comprises a third pair of gear wheels, for example a fourth and a fifth fixed gear 98, 100. The fourth fixed gear 98 is connected to the layshaft V, and the fifth fixed gear 100 is connected to the power-splitting transmission 52, for example to a sun gear 102 of the power-splitting transmission 52, for example connected in a rotationally fixed manner and/or so as to be drivable. The fourth fixed gear 98 meshes with the fifth fixed gear 100, thus is for example in constant meshing engagement with said fifth fixed gear 100.

The power-splitting transmission 52 is embodied as a planetary gear set. A ring gear 104 of the power-splitting transmission 52 by way of or by the first gear set 54 is connected to the third shaft W3, for example connected so as to be drivable. The ring gear 104 is connected to the second fixed gear 92, for example connected in a rotationally fixed and/or drivable manner. As a result, a force and/or a rotating movement and/or a torque from the primary drive element 22, by way of the primary transmission 24, is able to be transmitted to the third shaft W3 and, by way of the first gear set 54, onward to the ring gear 104 and thus for example the power-splitting transmission 52, or the planetary gear set, respectively. The first vehicle axle 26, by way of the second shaft W2 or by the second shaft W2, is connected to a planet carrier 106, or to a web of the power-splitting transmission 52, respectively, for example connected so as to be drivable. The planet carrier 106 is connected to the second shaft W2, for example connected in a rotationally fixed manner and/or so as to be drivable. As a result, a force and/or a rotating movement and/or a torque from the power-splitting transmission 52 is able to be transmitted by way of the planet carrier 106 to the second shaft W2 and, for example by way of the first differential 30, onward to the first vehicle axle 26. A planet set, for example one or a plurality of planet gears 108, which mesh in each case with the sun gear 102 and the ring gear 104, thus are for example in constant meshing engagement with said sun gear 102 and ring gear 104, is rotatably mounted on the planet carrier 106. The planet set can for example have a set of planet gears 108. The planet set can comprise three planet gears 108. Moreover, the sun gear 102 of the power-splitting transmission 52, by way of the fifth fixed gear 100 and the fourth fixed gear 98, and for example onward by way of the layshaft V and the switching element and the second gear set, is connected to the first additional drive element, for example connected so as to be drivable. As a result, a force and/or a torque from the first additional drive element, by way of the second gear set and the switching element, is able to be transmitted to the layshaft, and from the layshaft by way of the fourth fixed gear 98 and the fifth fixed gear 100 to the sun gear 102 of the power-splitting transmission 52.

Figure 11:
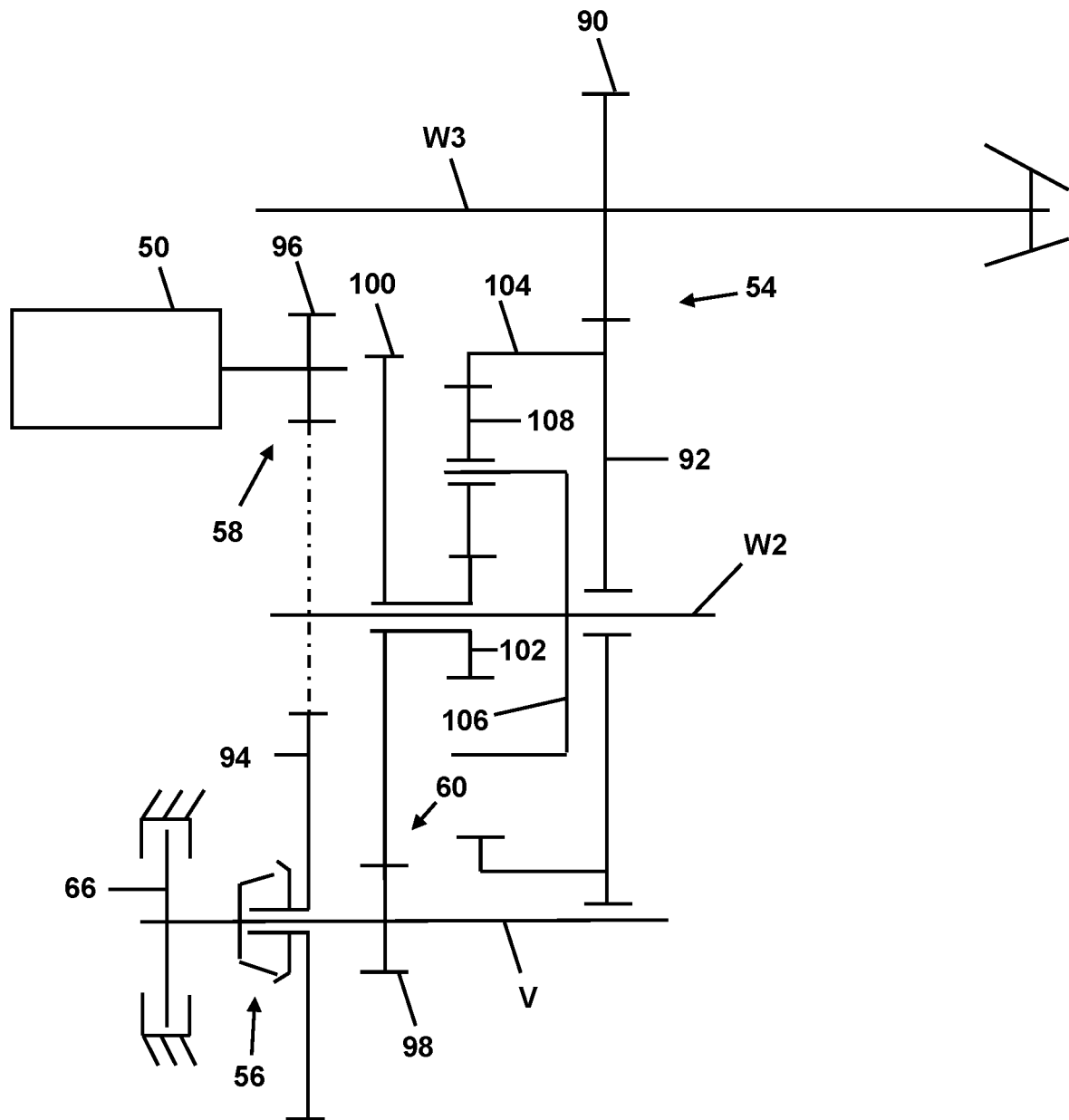
FIG. 11 shows a detailed schematic illustration of a tenth exemplary embodiment of the power-split axle drive according to the disclosure.

FIG. 11 shows a detailed schematic illustration of a tenth exemplary embodiment of the power-split axle drive 20 according to the disclosure, for example of the power-splitting transmission 52 and of the first additional drive element 50. The power-split axle drive 20 shown in FIG. 11 corresponds substantially to the power-split axle drive 20 shown in FIGS. 1 to 10, and therefore only details and/or points of differentiation will be discussed below. The agricultural vehicle 10 can comprise the power-split axle drive 20, as is illustrated in FIG. 11. The first brake 66 is disposed on the layshaft V. The first brake 66 is connected to the layshaft V, for example connected to the layshaft V so as to be drivable, such as connected to the layshaft V in a rotationally fixed manner and/or so as to be drivable. When the first brake 66 is activated, thus is for example closed, the power-splitting transmission 52 operates at a fixed ratio, thus completely mechanically. The power-splitting transmission 52 can then transmit the braking torque from the first vehicle axle 26 to the vehicle brake or the rear axle brake (on the second vehicle axle 28). Likewise, more mechanical force can be transmitted to the first vehicle axle 26 by the first brake 66.

Figure 12:
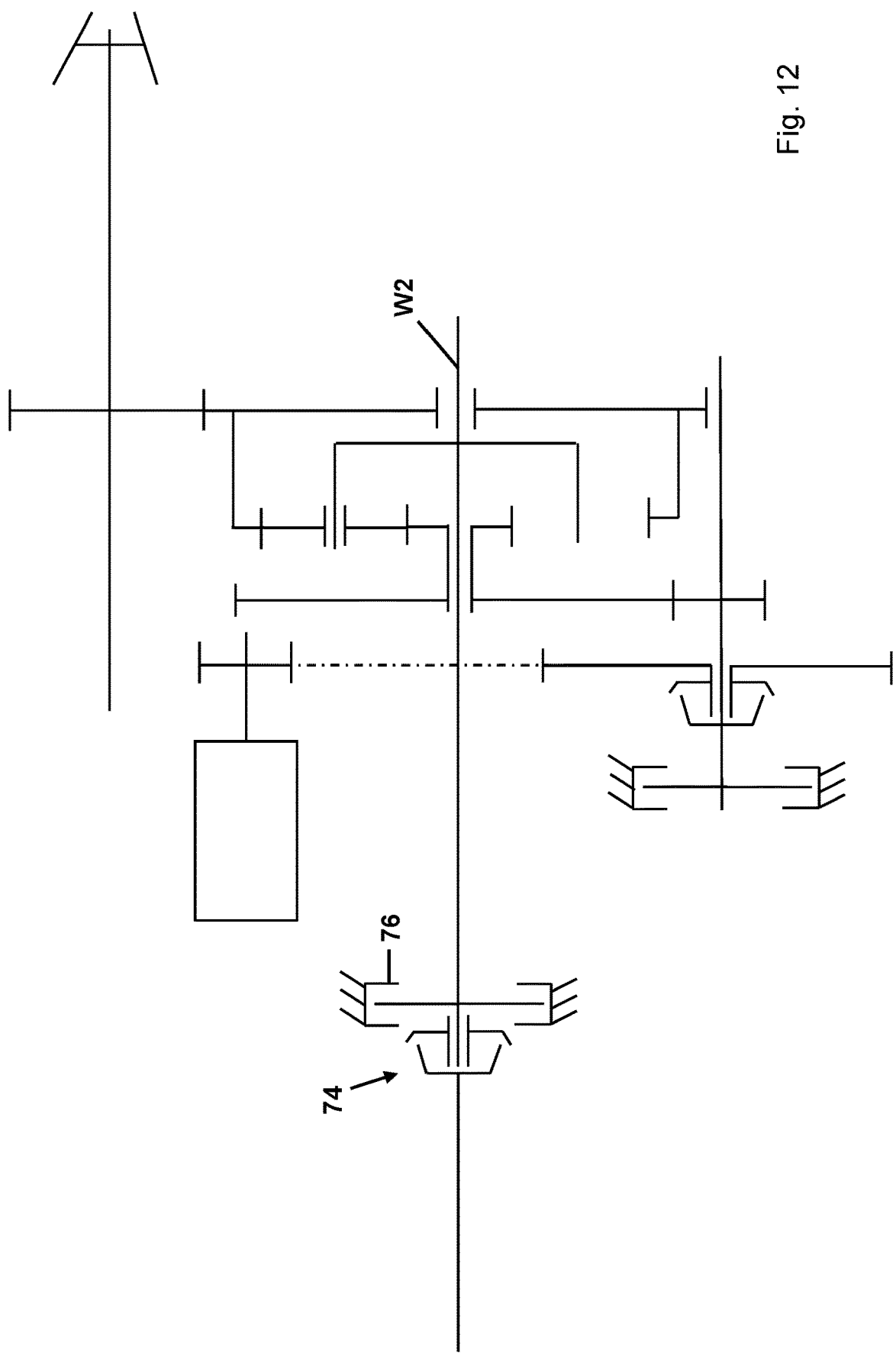
FIG. 12 shows a detailed schematic illustration of an eleventh exemplary embodiment of the power-split axle drive according to the disclosure.

FIG. 12 shows a detailed schematic illustration of an eleventh exemplary embodiment of the power-split axle drive 20 according to the disclosure. The axle drive 20 shown in FIG. 12 corresponds substantially to the power-split axle drive 20 shown in FIGS. 1 to 11, and therefore only details and/or points of differentiation will be discussed below. The agricultural vehicle 10 can comprise the power-split axle drive 20, as is illustrated in FIG. 12. The second switching element 74 and the second brake 76 are disposed on the second shaft W2 between the power-splitting transmission 52 and the first vehicle axle 26.

Figure 13:
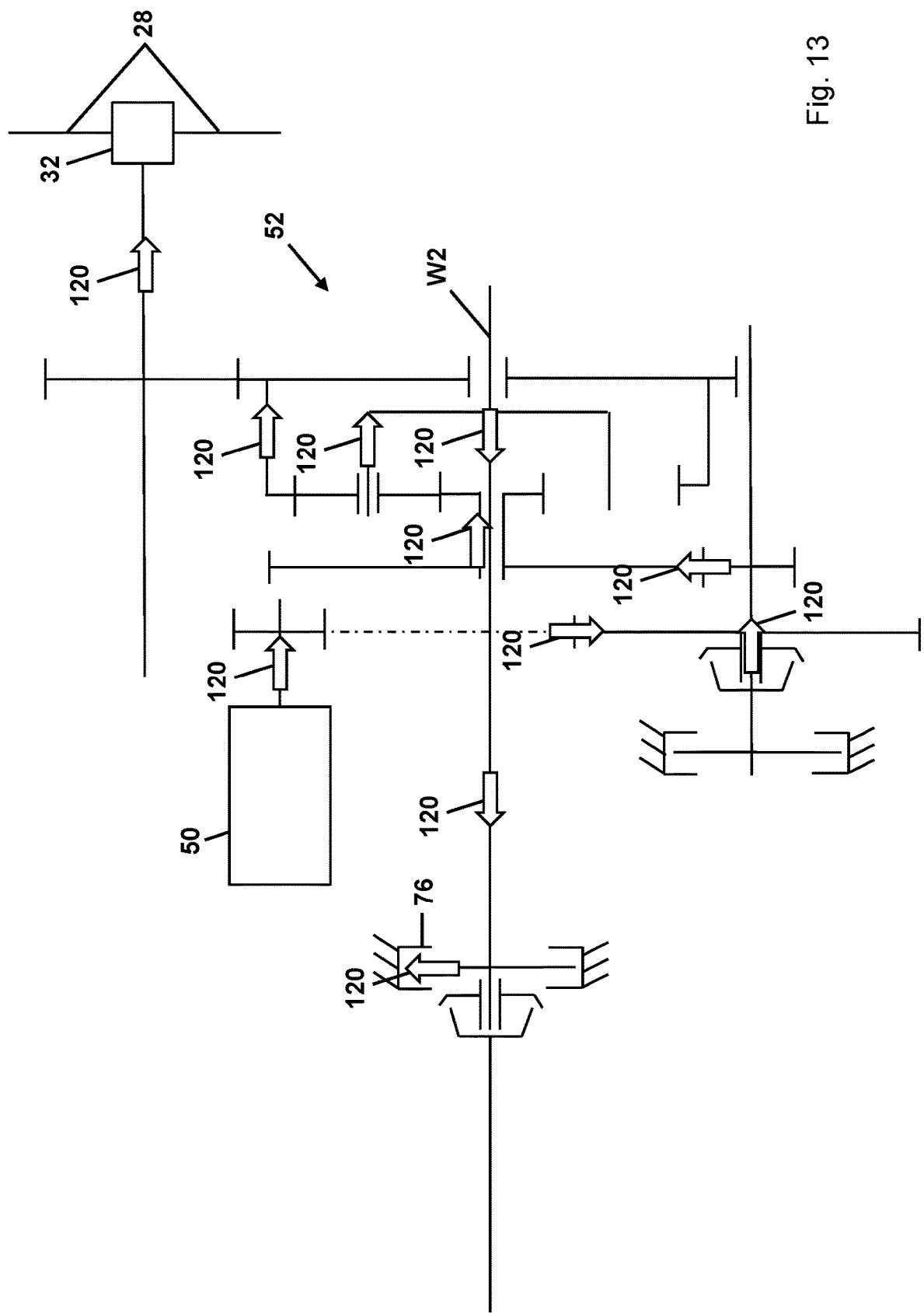
FIG. 13 shows a schematic illustration of the power flux in the "fully electric" operating mode of the power-split axle drive according to the disclosure.
Figure 14:
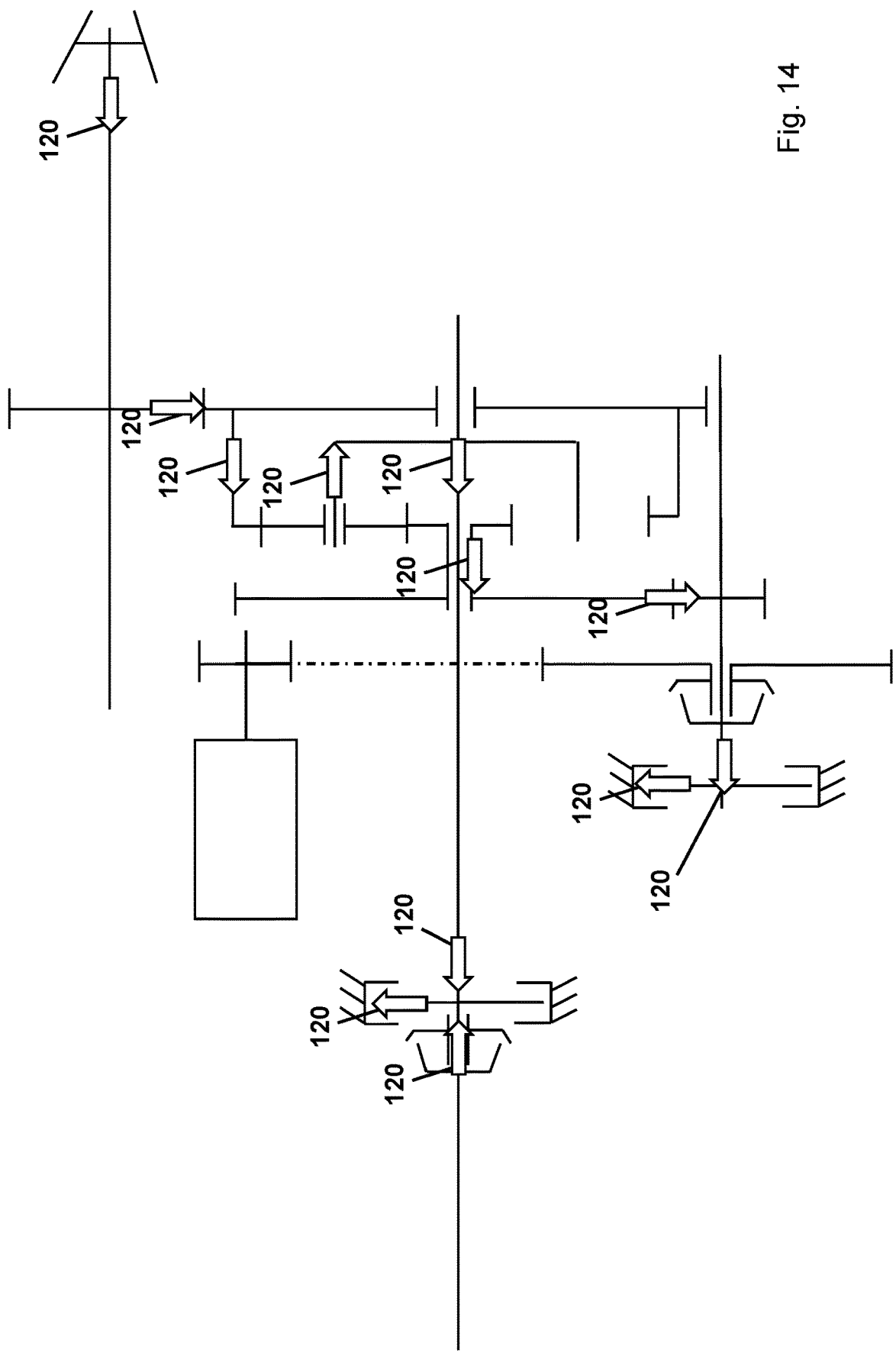
FIG. 14 shows a schematic illustration of the power flux in the "parking brake" operating mode of the power-split axle drive according to the disclosure.
Figure 15:
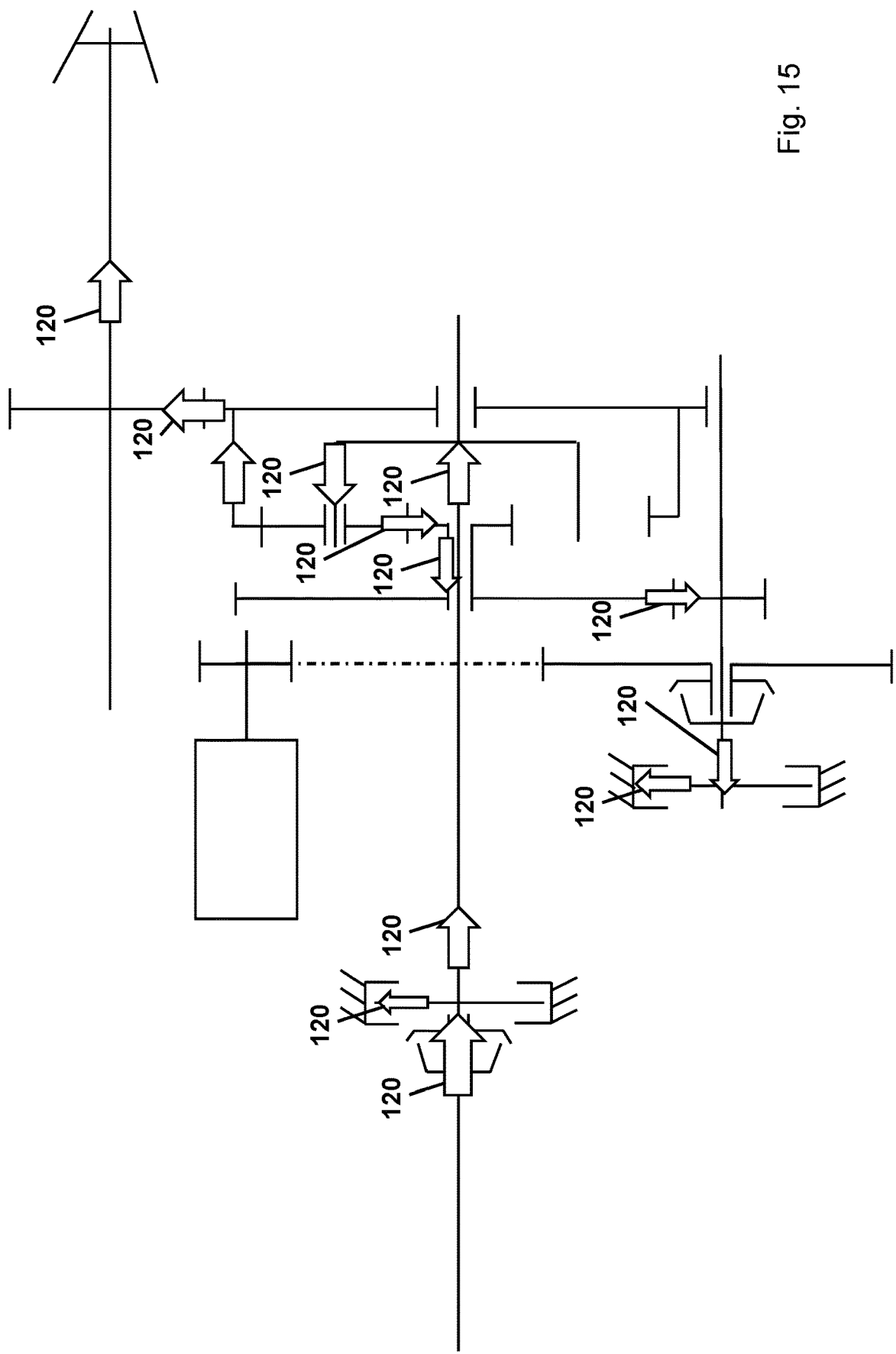
FIG. 15 shows a schematic illustration of the power flux in the "vehicle axle brake" operating mode of the power-split axle drive according to the disclosure.

FIGS. 13 to 15 show schematic illustrations of the power flux in the "fully electric" operating mode, the "parking brake" operating mode and the "vehicle axle brake" operating mode in the power-split axle drive 20 according to the disclosure. The power-split axle drive 20 shown in FIGS. 13 to 15 here corresponds substantially to the power-split axle drive 20 shown in FIGS. 1 to 12, and therefore only details and/or points of differentiation will be discussed below. The arrows 120 here show the direction of the power flux, thus the direction of the transmission of a rotating movement and/or a force and/or a torque. The size of the arrows 120 schematically indicates the magnitude of the transmitted rotating movement and/or force and/or the transmitted torque.

FIG. 13 shows the power flux of the "fully electric" operating mode. In the "fully electric" operating mode, a power flux, thus a rotating movement and/or a force and/or a torque, from the first additional drive element 50 is transmitted by way of the power-splitting transmission 52 to the second vehicle axle 28. A rotating movement and/or a force and/or a torque which is transmitted from the power-splitting transmission 52 to the second shaft W2, thus for example in the direction of the first vehicle axle 26, can be held and/or inhibited and/or supported on or by the closed second brake 76. For example, the second shaft W2 can be held or inhibited in relation to a rotating movement of the second shaft W2 by the second brake 76.

FIG. 14 shows the power flux of the "parking brake" operating mode. In the "parking brake" operating mode, a power flux, thus a rotating movement and/or a force and/or a torque, from the first and/or the second vehicle axle 26, 28 is transmitted to the power-split axle drive 20 and supported. The vehicle is held in its position as a result.

FIG. 15 shows the power flux of the "vehicle axle brake" operating mode. In the "vehicle axle brake" operating mode, a power flux, thus a rotating movement and/or a force and/or a torque, from the first and/or the second vehicle axle 26, 28 is transmitted to the power-split axle drive 20 and at least partially inhibited and/or held and at least partially transmitted to the rear axle brake. As a result, the vehicle is braked, for example in the driving or coasting operation.

Figure 16:
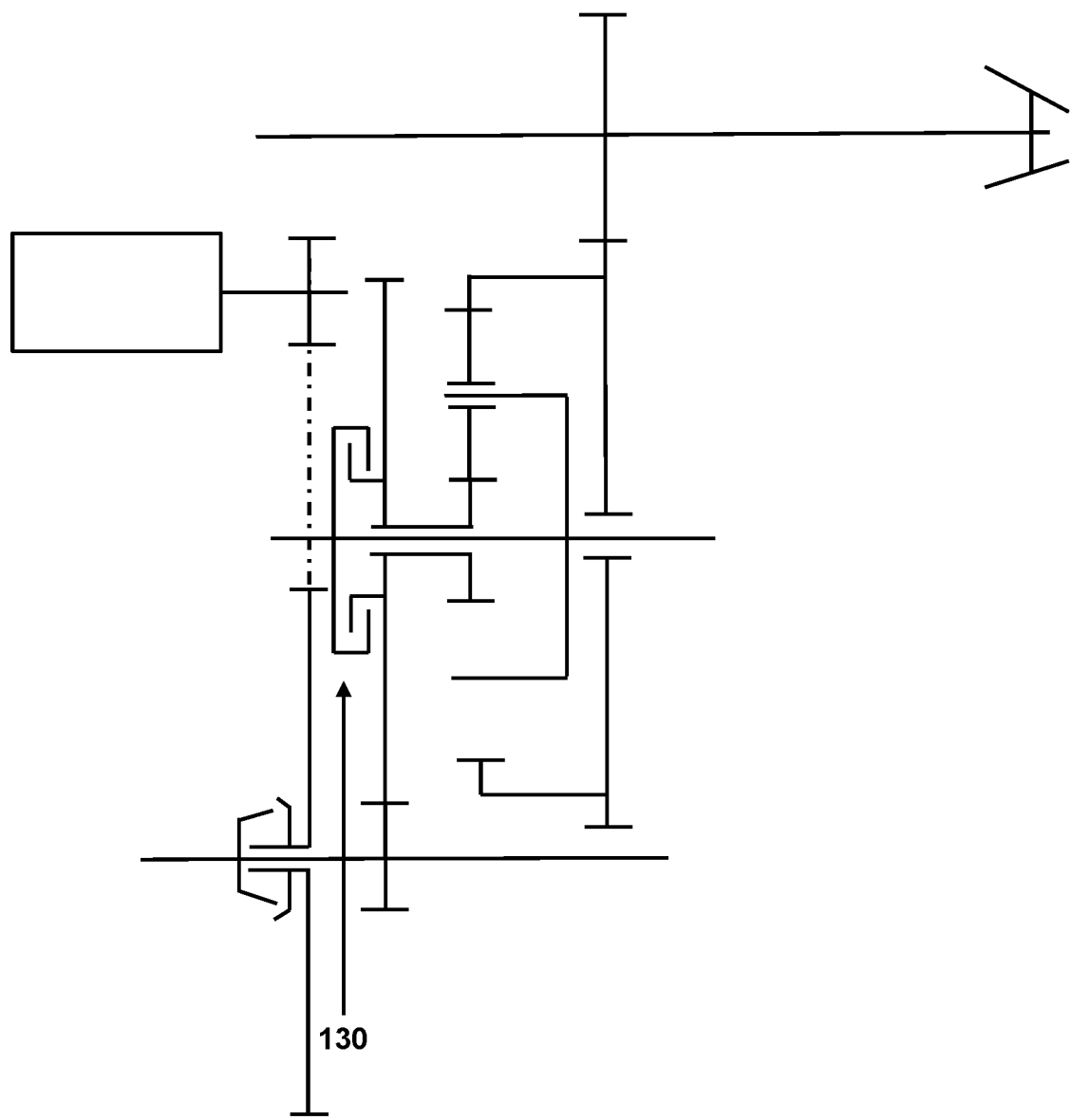
FIG. 16 shows a detailed schematic illustration of a twelfth exemplary embodiment of the power-split axle drive according to the disclosure.

FIG. 16 shows a detailed schematic illustration of a twelfth exemplary embodiment of the power-split axle drive 20 according to the disclosure. The axle drive 20 shown in FIG. 16 corresponds substantially to the power-split axle drive 20 shown in FIGS. 1 to 15, and therefore only details and/or points of differentiation will be discussed below. The agricultural vehicle 10 can comprise the power-split axle drive 20, as is illustrated in FIG. 16.

The power-splitting transmission 52, instead of the first brake 66, alternatively comprises a fifth switching element 130. The fifth switching element 130 is configured as a fifth clutch. The fifth fixed gear 100 and/or the sun gear 102, by way of the closed fifth switching element 130, are connected in a rotationally fixed manner to the second shaft W2. The first and the second vehicle axle 26, 28 both are thus mechanically driven by the primary drive element 22. For example, the relative speed of the sun gear 102 and of the second shaft W2 is 0 (zero) revolutions per minute. This leads to the ring gear 104 rotating at the same speed as the sun gear 102 and the second shaft W2. With an opened fifth switching element, a rotating speed and/or a force and/or a torque of the first additional drive element 50 from the fifth fixed gear 100 and/or the sun gear 102 may be able to be transmitted to or introduced into the power-splitting transmission 52.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A power-split axle drive for an agricultural vehicle, comprising:
   a first additional drive element;
   a first vehicle axle;
   a second vehicle axle;
   a primary drive element for providing a torque which via a first shaft is able to be transmitted to a primary transmission, the primary transmission being connected to the second vehicle axle, and at least the second vehicle axle via the primary transmission being able to be driven by the torque of the primary drive element, and the power-split axle drive having a power-splitting transmission, the power-splitting transmission via a first gear set being connected to the second vehicle axle and the primary transmission, and via a second shaft being connected to the first vehicle axle, wherein the first additional drive element via a first switching element is able to be connected to the power-splitting transmission; and
   a first brake disposed on the second shaft.

2. The power-split axle drive of claim 1, further comprising:
   a layshaft, the first additional drive element via the first switching element being able to be connected to the layshaft.

3. The power-split axle drive of claim 1, further comprising:
   a second gear set and a third gear set, the first switching element via the second gear set being able to be connected to the first additional drive element, and a layshaft via the third gear set being connected to the power-splitting transmission.

4. The power-split axle drive of claim 1, wherein the power-splitting transmission is configured as a planetary gear set.

5. The power-split axle drive of claim 1, further comprising:
   a first second brake disposed between the first additional drive element and the power-splitting transmission.

6. The power-split axle drive of claim 1, further comprising:
   a second additional drive element.

7. The power-split axle drive of claim 6, further comprising:
   a third switching element disposed between the primary drive element and the primary transmission.

8. The power-split axle drive of claim 7, further comprising:
   a fourth switching element is disposed between the primary transmission and the primary drive element.

9. The power-split axle drive of claim 6, further comprising:
   a third switching element disposed between the primary drive element and the second additional drive element.

10. The power-split axle drive of claim 9, further comprising:
    a fourth switching element is disposed between the primary transmission and the second additional drive element.

11. The power-split axle drive of claim 6, further comprising:
    a third switching element is disposed between the primary drive element and the second additional drive element and between the primary drive element and the primary transmission.

12. The power-split axle drive of claim 11, further comprising:
    a fourth switching element is disposed between the primary transmission and the primary drive element and between the primary transmission and the second additional drive element.

13. The power-split axle drive of claim 1, further comprising:
    a second switching element disposed on the second shaft.

14. The power-split axle drive of claim 1, further comprising:
    a control device for actuating the power-split axle drive as a function of an operating mode of the power-split axle drive.

15. An agricultural vehicle comprising the power-split axle drive of claim 1, wherein the power-split axle drive is configured for driving the vehicle.

16. The agricultural vehicle of claim 15, wherein a control device is configured to determine different operating modes of the agricultural vehicle.

17. A method for operating the power-split axle drive of claim 1, wherein the method comprises a step of feedback-controlling a lead motion of the first vehicle axle as a function of a steering angle of the first vehicle axle and the second vehicle axle relative to one another.

18. An agricultural vehicle including a power-split axle drive, comprising:
    a first additional drive element;
    a first vehicle axle;
    a second vehicle axle;
    a primary drive element for providing a torque which via a first shaft is able to be transmitted to a primary transmission, the primary transmission being connected to the second vehicle axle, and at least the second vehicle axle via the primary transmission being able to be driven by the torque of the primary drive element, and the power-split axle drive having a power-splitting transmission, the power-splitting transmission via a first gear set being connected to the second vehicle axle and the primary transmission, and via a second shaft being connected to the first vehicle axle, wherein the first additional drive element via a first switching element is able to be connected to the power-splitting transmission; and
    a first brake disposed on the second shaft.

19. The power-split axle drive of claim 18, further comprising:
    a second brake disposed between the first additional drive element and the power-splitting transmission.

20. A method for operating a power-split axle drive for an agricultural vehicle including a first additional drive element, a first vehicle axle, a second vehicle axle, a primary drive element for providing a torque which via a first shaft is able to be transmitted to a primary transmission, the primary transmission being connected to the second vehicle axle, and at least the second vehicle axle via the primary transmission being able to be driven by the torque of the primary drive element, and the power-split axle drive having a power-splitting transmission, the power-splitting transmission via a first gear set being connected to the second vehicle axle and the primary transmission, and via a second shaft being connected to the first vehicle axle, wherein the first additional drive element via a first switching element is able to be connected to the power-splitting transmission, the method comprising:

a step of feedback-controlling a lead motion of the first vehicle axle as a function of a steering angle of the first vehicle axle and the second vehicle axle relative to one another.

\* \* \* \* \*